(12) United States Patent
De Jong et al.

(10) Patent No.: US 10,816,862 B2
(45) Date of Patent: Oct. 27, 2020

(54) DEVICE FOR CONTROLLING TRANSMISSION OF RADIATION

(71) Applicant: Merck Patent GmbH, Darmstadt (DE)

(72) Inventors: Ties De Jong, En Utrecht (NL); Casper Van Oosten, Cn Waalre (NL)

(73) Assignee: Merck Patent GmbH, Darmstadt (DE)

( * ) Notice: Subject to any disclaimer, the term of this patent is extended or adjusted under 35 U.S.C. 154(b) by 70 days.

(21) Appl. No.: 16/302,402

(22) PCT Filed: May 15, 2017

(86) PCT No.: PCT/EP2017/061559
§ 371 (c)(1),
(2) Date: Nov. 16, 2018

(87) PCT Pub. No.: WO2017/198585
PCT Pub. Date: Nov. 23, 2017

(65) Prior Publication Data
US 2019/0212601 A1 Jul. 11, 2019

(30) Foreign Application Priority Data
May 17, 2016 (EP) .................................. 16169881

(51) Int. Cl.
*G02F 1/1345* (2006.01)
*G02F 1/155* (2006.01)
(Continued)

(52) U.S. Cl.
CPC .......... *G02F 1/13452* (2013.01); *G02F 1/155* (2013.01); *G02F 1/1676* (2019.01);
(Continued)

(58) Field of Classification Search
CPC .................................................. G02F 1/13452
See application file for complete search history.

(56) References Cited

U.S. PATENT DOCUMENTS 5,724,187 A * 3/1998 Varaprasad ............. B32B 17/06
359/265
6,208,399 B1 * 3/2001 Ohta .................. G02F 1/134363
349/139

(Continued)

FOREIGN PATENT DOCUMENTS

EP 1295169 A1 3/2003
WO 2009141295 A1 11/2009
(Continued)

OTHER PUBLICATIONS

International Search Report PCT/EP2017/061559 dated Jul. 17, 2017 (pp. 1-2).

(Continued)

*Primary Examiner* — Sang V Nguyen
(74) *Attorney, Agent, or Firm* — Millen, White, Zelano & Branigan, P.C.

(57) ABSTRACT

Device for controlling transmission of radiation, comprises a first substrate comprising a first conductive layer; a second substrate comprising a second conductive layer; an active layer positioned between the first and second conductive layers for controlling the transmission of radiation by altering its light transmissivity dependent on a voltage applied to the first and second conductive layers; a first contact providing a first electrical connection to the first conductive layer; a first portion of an adhesive or solder for attaching a first proximal end of the first contact to the first conductive layer; a second contact providing a second electrical connection to the second conductive layer; and a second portion of adhesive or solder for attaching a second proximal end of the second contact to the first or second conductive layer.

28 Claims, 10 Drawing Sheets

(51) Int. Cl.
*G02F 1/1676* (2019.01)
*G02F 1/1334* (2006.01)
*G02F 1/167* (2019.01)

(52) U.S. Cl.
CPC ............ *G02F 1/1334* (2013.01); *G02F 1/167* (2013.01); *G02F 2201/56* (2013.01)

(56) References Cited

U.S. PATENT DOCUMENTS

| | | | |
|---|---|---|---|
| 6,317,248 B1* | 11/2001 | Agrawal | G02F 1/155 340/438 |
| 2003/0227664 A1* | 12/2003 | Agrawal | G02F 1/1523 359/269 |
| 2005/0190332 A1* | 9/2005 | Yano | B32B 17/10 349/149 |
| 2014/0043577 A1* | 2/2014 | Kim | G02F 1/133305 349/150 |
| 2014/0049500 A1* | 2/2014 | Chen | G06F 3/0412 345/174 |

FOREIGN PATENT DOCUMENTS

| | | |
|---|---|---|
| WO | 2010032070 A1 | 3/2010 |
| WO | 2017198585 A1 | 11/2017 |

OTHER PUBLICATIONS

R. Baetens et al., Solar Energy Materials & Solar Cells, 2010, pp. 87-105.

* cited by examiner

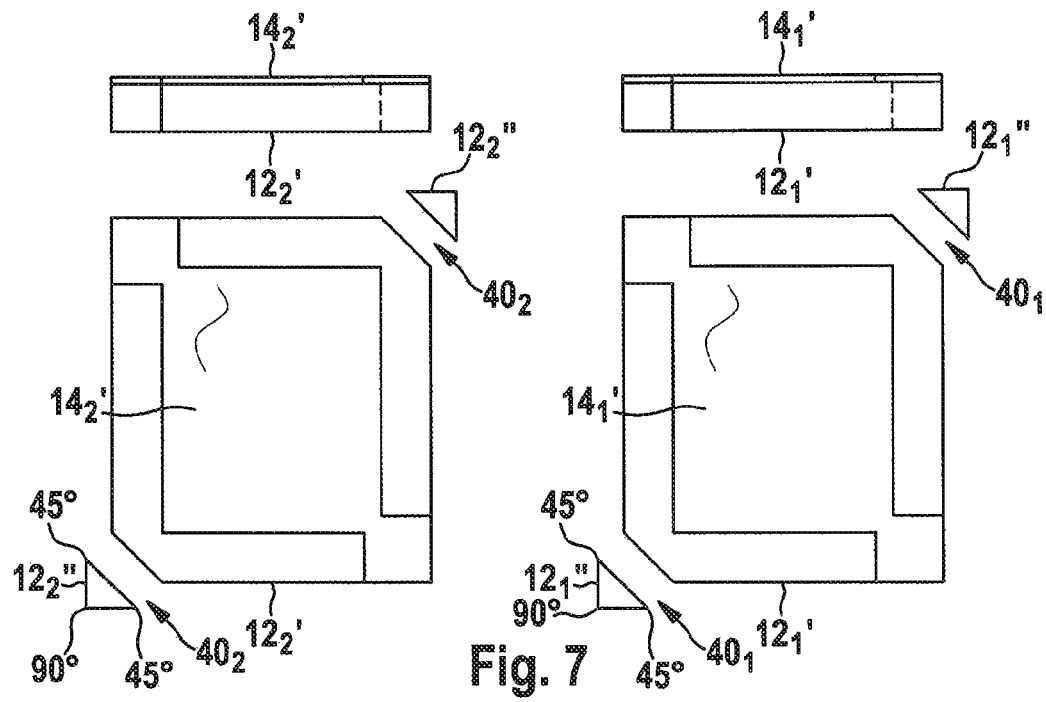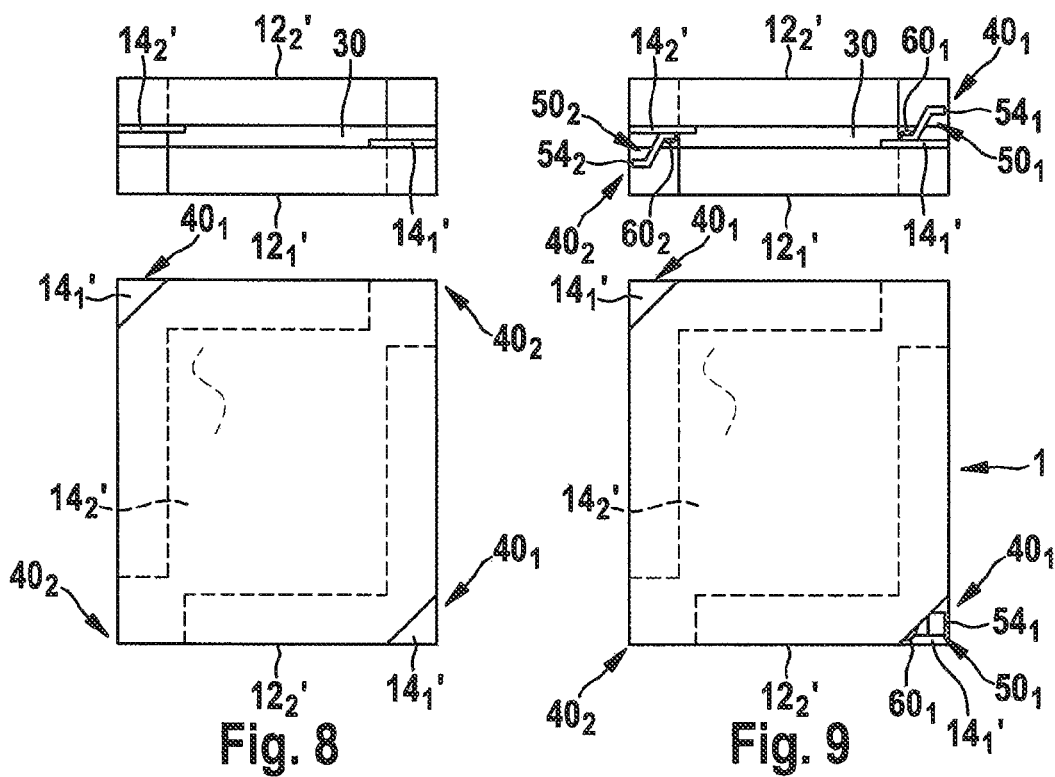

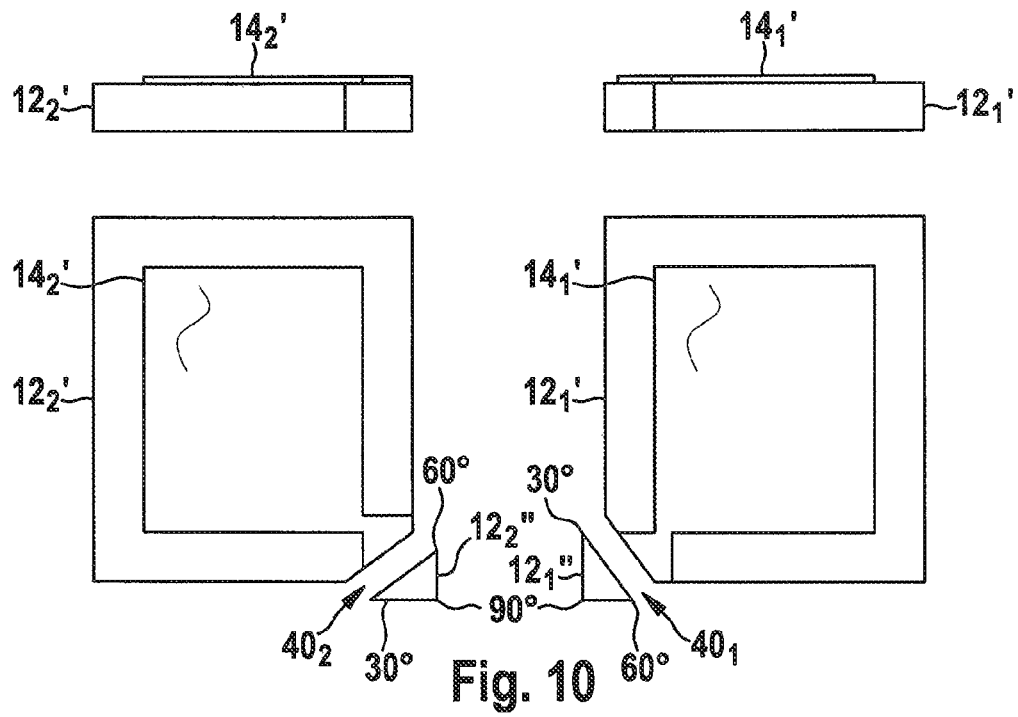
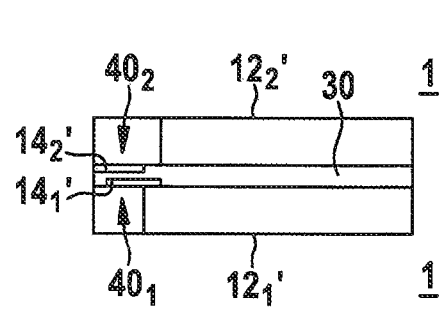
Fig. 10
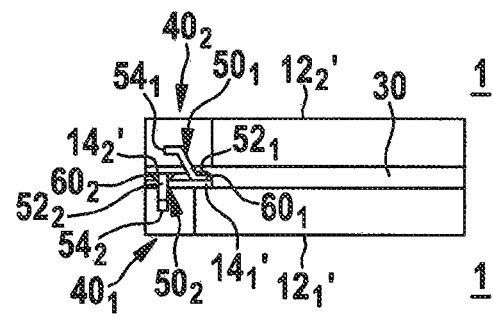
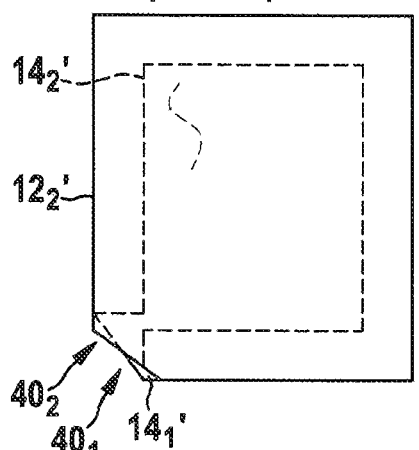
Fig. 11
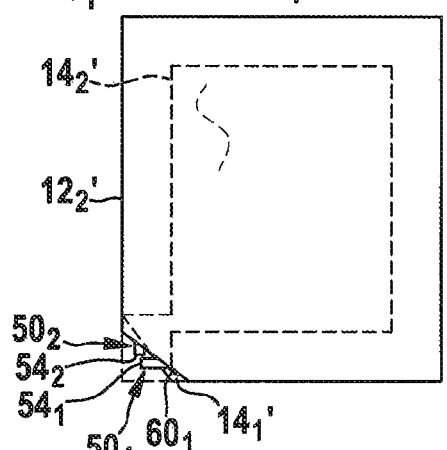
Fig. 12

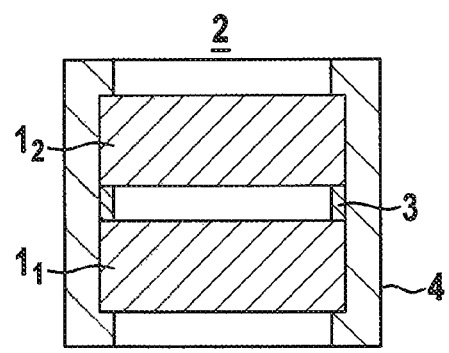
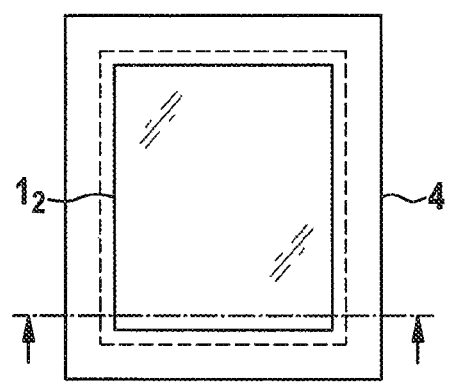
Fig. 21

DEVICE FOR CONTROLLING TRANSMISSION OF RADIATION

FIELD OF THE INVENTION

Embodiments of the invention described herein relate generally to controlling transmission of radiation, and more particularly to a device and method for controlling transmission of radiation, for example electromagnetic radiation (EMR) such as light, in particular visible light, or ultraviolet (UV) i. e. heat, in a window or display.

BACKGROUND OF THE INVENTION

In the sense of the present application, Light means electromagnetic radiation in the range of 320 nm to 3 µm, i. e. in the near ultraviolet (NUV), including the ultraviolet-A (UV-A), visible (VIS) and near infrared (NIR) spectrum, and heat means electromagnetic radiation in the range of 3 µm to 1 mm, i. e. in the mid infrared (MIR-) and far infrared (FIR) spectrum.

Devices for controlling, e. g. switching, transmission of radiation, e. g. light and heat, mean devices having at least two states, where in one state (dark state, scattering state, absorptive state, off state) of these states, they allow only a small proportion of the incident radiation to pass through at all, or they allow only a small proportion of the incident light to pass through unscattered, while in another state (clear state, transmissive state, on state) of these states, they allow a large proportion of the incident radiation to pass through.

Owing to this function, the devices have attracted considerable interest, in particular for use in architecture or automotive applications, to improve the light conditions and indoor climate, and, thus, the well-being of the occupants (users). Compared to conventional glazing systems, e. g. windows, glazing systems comprising the devices, or using the methods, described in the present application allow for new designs and usages of facades, e. g. privacy and projection. The user can determine the degree of light transmission through the window at will via an interface.

Typically, these devices are switched from one state to the other by application of a voltage, creating an electrical filed, across a switching layer (active layer) which comprises a functional material. Different technical solutions have been proposed and are commercially used for this purpose, among them liquid-crystal-(LC-) based switchable devices, electrochromic switchable devices and suspended-particle-(SP-) based switchable devices. Among the liquid-crystal-based switchable devices, the ones based on dye-doped small-molecule liquid crystals, and the ones based on polymer-dispersed liquid crystals are of currently high technical relevance. A review of the different technical solutions is given, for example, in R. Baetens et al., Solar Energy Materials & Solar Cells, 2010, 87-105.

In order to create the electric field, the devices require substrates, e. g. glass or plastic, coated with a transparent conductive coating separated by the active layer. In order to control the devices, the coated substrates have to be coupled to an electrical power source, supplying the voltage. In order to establish the connection, i. e. a secure connection with low resistance, electrical wirings have to be attached to the transparent conductive coating. As substrates and devices having an electrical wiring attached thereto cannot be processed using standard processes established in the glazing industry for processing conventional glazing systems, the production of the devices for controlling transmission of radiation is cumbersome and expensive.

WO 2009/141295 A1 discloses an optical device comprising a switchable layer, at least one alignment layer, and a light guiding system, whereas the switchable layer comprises a luminescent material for absorbing and emitting light, whereby the alignment of the luminescent material is changeable and the light guiding system guides the emitted light, whereby the switchable layer is in contact with the at least one alignment layer and the luminescent material exhibits anisotropic properties, whereby the optical device comprises a light energy-converting means, wherein the light guiding system is in physical contact with the energy converting means.

WO 2010/032070 A1 discloses a switchable film assembly having remote electrical connections. The switchable film comprises an active layer between first and second electrically conductive layers. The active layer has an optical transmission which changes upon projecting an electric field therethrough. Electrical connection means to connect the film to a power supply are also provided. At least one of the electrical connection means comprises a remote electrical connector region provided remote to the first and second electrically conductive layers, such upon connecting the film assembly to the power supply, an electrical field may be projected through at least a portion of the switchable film assembly thereby changing the optical transmission of the active layer.

In order to obtain glazing systems comprising devices for controlling transmission of radiation dedicated processing equipment and productions lines are required. Thus, production of these glazing systems is cumbersome and expensive.

Further, in order to obtain homogenous and fast switching in large-sized glazing systems, a plurality of electrical wirings has to be attached to the devices.

Furthermore, owing to ambient lighting conditions and/or depending on an angle in which the sun shines through a glazing system, it would also be very desirable to control parts (segments) of the glazing system independently, e. g. an upper part of the glazing system should be in the dark state while a lower part of the glazing system should be in the clear state. However, each segment requires at least one electrical connection. Thus, in order to glazing systems comprising a plurality of independently controllable segments, an even larger plurality of electrical wirings has to be attached to the devices.

As the number of electrical wirings increases, the production of glazing systems comprising devices for controlling transmission of radiation gets even more cumbersome and expensive.

Therefore, a device for controlling transmission of radiation, wherein electrical wirings may be easily and inexpensively attached to conductive coatings, and a corresponding method for making same are required.

For these and other reasons, there is a need for the invention as set forth in the following embodiments.

SUMMARY OF THE INVENTION

The invention aims to provide a device for controlling transmission of radiation and a corresponding method for making same.

This object is solved by the subject matter of the independent claims. The first substrate and the second substrate are paired such that an area of at least one of the substrates is exposed, i. e. not covered by the other substrate. The subject matter accommodates, i. e. contains, encloses, holds, houses or puts up, the first contact and the second contact within the contour, i. e. outline, perimeter or profile, of the device, i. e. the paired substrates of the device. Thus, the subject matter prevents the first contact and the second contact from protruding, i. e. extending or projecting, beyond the contour of the device. As a result, the first contact and the second contact are contained within and protected by the device, and the device becomes compatible with a conventional glazing system, e. g. window, insulating glass window or laminated glass window. Thus, the device can be processed using standard processes already established in the glazing industry for processing conventional glazing systems, and the production of the device for controlling transmission of radiation is greatly simplify and costs are greatly reduced. Any electrical wiring is attached to the first contact and/or the second contact after production of the device. Furthermore, the electrical wiring may be attached to the first contact and/or the second contact at any desired position on the substrate, and, therefore, a housing of the window may be simplified. Thus, the electrical wiring may be selected from a variety of suitable wirings. Moreover, the device may be produced from commercially available components.

This object is solved by a device for controlling transmission of radiation, characterized by comprising a first substrate comprising a first conductive layer; wherein the first conductive layer is structured such that a first area and a second area are electrically isolated from each other; a second substrate comprising a second conductive layer; an active layer positioned between the first area of the first conductive layer and the second conductive layer for controlling the transmission of the radiation by altering its light transmissivity dependent on a voltage applied to the first conductive layer and the second conductive layer; a first contact for providing a first electrical connection to the first area of the first conductive layer; a second contact for providing a second electrical connection to the second area of the first conductive layer; and an interconnection, for example via, for providing a third electrical connection between the second area of the first conductive layer and the second conductive layer. As a result, the contacts may be situated on one of the substrates. Further, the interconnection may be provided by a portion of an electrically conductive adhesive or sealant, for example curable electrically conductive adhesive or sealant, such as two-component curable electrically conductive adhesive or sealant, radiation-curable electrically conductive adhesive or sealant, light-curable electrically conductive adhesive or sealant, ultraviolet-curable electrically conductive adhesive or sealant, thermally curable electrically conductive adhesive or sealant, heat-curable electrically conductive adhesive or sealant, electrically conductive hotmelt or humidity-curable electrically conductive adhesive or sealant. Thus, the portion of the electrically conductive adhesive or sealant may be directly applied to the second area of the first conductive layer and/or the second conductive layer. Furthermore, the portion of the electrically conductive adhesive or sealant may be combined with/integrated in/surrounded by another portion of a non-conductive adhesive or sealant for containing the active layer. Thus, design and/or assembly of the device may be simplified.

According to an aspect of the invention, the device further comprises a first electrical connector, wire-to-board connector, port or interface for housing the first contact and/or a second electrical connector, wire-to-board connector, port or interface for housing the second contact. As a result, the first contact and/or the second contact may be protected against damage. Further, the electrical connections between the first contact and/or the second contact and the electrical wiring attached after production of the device may be improved and/or secured. The height of the connectors may be adapted to the thickness of the substrates such that the connectors sit within the perimeter of the device. Further, connector housings provide for a quick and/or reliable connection. Still further, they do not require additional tools. Furthermore, they are available in small sizes and/or lightweight. Moreover, they are compatible with, and readily available in, standard processes in the electronics manufacturing services industry.

According to an aspect of the invention, a first distal end, i. e. first elongated end portion, of the first contact is aligned parallel to the first conductive layer and/or a second distal end, i. e. second elongated end portion, of the second contact is aligned parallel to the second conductive layer. As a result, the electrical wiring may be attached to a side of the device, for example by pushing the electrical wiring along the conductive layers and, thus, into or onto the distal ends.

According to an aspect of the invention, a first distal end, i. e. first elongated end portion, of the first contact is aligned perpendicular to the first conductive layer and/or a second distal end, i. e. second elongated end portion, of the second contact is aligned perpendicular to the second conductive layer. As a result, the electrical wiring may be attached to a face of the device, for example by pushing the electrical wiring towards the conductive layers and, thus, into or onto the distal ends.

According to an aspect of the invention, the first contact is situated on a first side of the device, and the second contact is situated on a second side of the device, being opposite to the first side. As a result, the device may be produced from two substrates having an identical and/simple basic shape. The simple basic shape may be rectangle, i. e. square or oblong, for example. Thus, the number of different elements may be reduced, and the production process may be simplified and/or more flexible.

According to an aspect of the invention, the first contact is situated on a first corner of the device and the second contact is situated on a second corner of the device, being opposite to the first corner. Again, the device may be produced from two substrates having an identical basic shape. Thus, the number of different elements may be reduced, and the production process may be simplified and/or more flexible.

According to an aspect of the invention, the first contact and the second contact are situated on one corner of the device. As a result, the electrical wiring may be attached to the device at a single point. Thus, the production process may be further simplified.

According to an aspect of the invention, a thickness of the first contact is less than a thickness of the first substrate and/or a thickness of the second substrate.

According to an aspect of the invention, a thickness of the second contact is less than the thickness of the first substrate and/or the thickness of the second substrate.

According to an aspect of the invention, the first contact is a first pin contact (male plug) or a first socket contact (female receptacle) and/or the second contact is a second pin contact or a second socket contact. As a result, contact resistance of the electrical connections may be reduced and/or the electrical connections may be further secured. Further, correctness of the electrical wiring may be ensured.

According to an aspect of the invention, the adhesive is an electrically conductive adhesive. As the result, the portions of the adhesive may be directly applied to the conductive layers and/or proximal ends. Thus, resistance between the proximal ends of the contacts and the conductive layers may be reduced. Further, the portions may be reduced and/or the application of the adhesive may be simplified. Furthermore, environmental effects and, thus, corrosion may be reduced.

According to an aspect of the invention, the adhesive is a curable adhesive, two-component curable adhesive, radiation-curable adhesive, light-curable adhesive, ultraviolet-curable adhesive, thermally curable adhesive, heat-curable adhesive, hotmelt or humidity-curable adhesive. As a result, application of the adhesive is further simplified. Moreover, parameters of the adhesive, e. g. viscosity, thixotropic index and pot life, and curing conditions, e. g. temperature and duration, may be matched to the parameters of the established process for producing a window, e. g. LC window. Thus, compatibly of the device with a conventional glazing system may be further increased. Further, a thixotropic adhesive may simplify handling, application on the substrates and curing in a vertical position. Still further, in combination with a suitable chosen connector, the adhesive in uncured condition may have a viscosity that keeps the connector in place without any need for additional fixation while the device is being moved through a curing step. In contrast, when wires are to be attached directly to the transparent conductive substrate, a mechanical clamping of the wires is always required during the curing step. Furthermore, pot life of the adhesive may be long enough to allow application to a plurality of positions and/or a plurality of devices. The curing conditions for the adhesive may be varied, such that the adhesive may be cured during an established curing process.

According to an aspect of the invention, the first substrate and/or the second substrate comprise glass or silica glass. As a result, the device may be robust, strong, durable and long-lived. Further, the device may be comparatively inexpensive.

According to an aspect of the invention, the first substrate and/or the second substrate comprise plastics or polyethylene terephthalate (PET). As a result, the device may be light.

According to an aspect of the invention, the first substrate and the second substrate are identical, i. e. they have the very same (identical) shape, or inverse, i. e. they have mirror-image (reverse) shapes, to each other. As a result, the number of different elements may be reduced, and the production process may be simplified and/or more flexible.

According to an aspect of the invention, the first substrate and/or the second substrate have a basic shape of a quadrilateral, parallelogram, rhombus, rhomboid, rectangle, square or oblong. As a result, processing of the substrates, that have four straight sides, may be simplified and/automated.

According to an aspect of the invention, the first space and the second space are identical or inverse to each other. As a result, the first contact and the second contact may be situated on one corner of the device. Thus, the electrical wiring may be attached to the device at a single point, and the production process may be further simplified.

According to an aspect of the invention, the first space and/or the second space have a shape of a triangle, right-angled triangle or right-angled triangle comprising a first leg, i. e. cathetus, having a first length and a second leg having a second length, being 1.0, i. e. two angles of 45°, between 1/1.7 and 1/1.8 or 1/√3, i. e. one angle of 30° and one angle of 60°, of the first length. The shapes may be situated along the circumference of the substrates and in particular at the corner of the substrates. Moreover, spaces at the corners of the substrates may increase the stability of the substrates.

According to an aspect of the invention, the first space and/or the second space have a shape of a rectangle, square or oblong. The shapes may be situated along the circumference of the substrates.

According to an aspect of the invention, the first space in the first substrate and/or the second space in the second substrate are obtained by removing the second shape from a second blank substrate. As a result, the substrates may be easily produced from blank substrates that are commercially available.

According to an aspect of the invention, the first conductive layer and/or the second conductive layer comprise metal, metal mash, silver (Ag), silver nanoparticles, metal oxide, silver oxide, doped metal oxide, transparent metal oxide (TCO), tin-doped indium oxide (indium tin oxide, ITO), doped binary compounds, aluminium-doped zinc oxide (AZO), indium-doped cadmium oxide, carbon nanotubes (CNTs), graphene, conductive polymers or poly(3,4-ethylenedioxythiophene) polystyrene sulfonate (PEDOT:PSS). As a result, control of the transmission of the radiation in the device may be improved. Moreover, substrates or blank substrates readily comprising a conductive layer may greatly simplify production and greatly reduce costs.

According to an aspect of the invention, the first conductive layer and/or the second conductive layer are structured on the first substrate and/or the second substrate by selective deposition, for example printing, such as screen printing or ink jet printing, or selective removal, for example etching, such as wet etching or scribing, such as Laser scribing.

According to an aspect of the invention, the active layer is a liquid crystal layer, for example polymer-dispersed liquid crystal layer, suspended particle display layer, electrochromatic layer, electrowetting layer or electrophoretic layer, or the active layer comprises liquid crystals (LCs), for example dye-doped liquid crystals or polymer-dispersed liquid crystals (PDLCs), or suspended particles (SPs). As a result, control of the transmission of the radiation in the device may be improved. As a result, control of the transmission of the radiation in the device may be improved.

According to an aspect of the invention, the voltage is alternating voltage or direct voltage. As a result, the voltage may be adapted to the requirements of the active layer. Moreover, the active layer may be passively controlled, where signals applied to the device directly control the active layer, or actively controlled, where the signals indirectly control the active layer via an electrical circuit, for example amplification circuit or buffer circuit.

According to an aspect of the invention, the device further comprises a first conductive line, for example busbar, structured on the first conductive layer and extending from the first contact onto the first conductive layer, for electrically connecting the first conductive layer to the first contact, wherein a thickness of the first conductive line is less than a thickness of the active layer. The first conductive line increase conductivity of the first conductive layer, and, thus, reduces losses of electrical signals thereon.

According to an aspect of the invention, the device further comprises a second conductive line, for example busbar, structured on the second conductive layer and extending from the second contact onto the second conductive layer, for electrically connecting the second conductive layer to the second contact, wherein a thickness of the second conductive line is less than the thickness of the active layer. The second conductive line increase conductivity of the second conductive layer, and, thus, reduces losses of electrical signals thereon.

According to an aspect of the invention, the first conductive line is structured outside an visible area of the device.

According to an aspect of the invention, the first conductive line is structured under a main sealant or inside an area between the main sealant and an edge, i. e. a side or perimeter of the first substrate.

According to an aspect of the invention, the first conductive line comprises a metal, for example silver, or carbon.

According to an aspect of the invention, the first conductive line is structured on the first conductive layer by selective deposition, for example printing, such as screen printing or ink jet printing, or selective removal, for example etching, such as wet etching or scribing, such as Laser scribing.

According to an aspect of the invention, the first conductive line is in direct contact with the first portion of the adhesive or solder.

According to an aspect of the invention, the second conductive line is structured outside the visible area of the device.

According to an aspect of the invention, the second conductive line is structured under the main sealant or inside an area between the main sealant and an edge, i. e. a side or perimeter, of the second substrate.

According to an aspect of the invention, the second conductive line comprises a metal, for example silver, or carbon.

According to an aspect of the invention, the second conductive line is structured on the second conductive layer by selective deposition, for example printing, such as screen printing or ink jet printing, or selective removal, for example etching, such as wet etching or scribing, such as Laser scribing.

According to an aspect of the invention, the second conductive line is in direct contact with the second portion of the adhesive or solder.

According to an aspect of the invention, the first contact is attached to a first area of the first conductive layer; the second contact is attached to a second area of the first conductive layer; the first conductive layer is structured such that the first area and the second area are electrically isolated from each other; and the second area of the first conductive layer and the second conductive layer are electrically connected to each other. As a result, the contacts may be situated on one of the substrates.

According to an aspect of the invention, the second area of the first conductive layer and the second conductive layer are electrically connected via an interconnection (via), a conductive sealant, for example a sealant comprising a conductive particle, such as a via, or a plurality of conductive particles.

According to an aspect of the invention, a first busbar may be applied along a first edge of the first substrate and/or a second busbar may be applied along a second edge of the second substrate. As a result, switching of the active layer may be faster and/or more homogenous.

Another aspect of the invention is the method, further comprising providing a first electrical connector, wire-to-board connector, port or interface for housing the first contact and/or providing a second electrical connector, wire-to-board connector, port or interface for housing the second contact. As already described, the first contact and/or the second contact may be protected against damage. Further, the electrical connections between the first contact and/or the second contact and electrical wiring to be attached after production of the device may be improved and/or secured.

Another aspect of the invention is the method, further comprising aligning a first distal end of the first contact parallel to the first conductive layer and/or aligning a second distal end of the second contact parallel to the second conductive layer. As already described, the electrical wiring may be attached to a side of the device.

Another aspect of the invention is the method, further comprising aligning a first distal end of the first contact perpendicular to the first conductive layer and/or aligning a second distal end of the second contact is perpendicular to the second conductive layer. As already described, the electrical wiring may be attached to a face of the device.

Another aspect of the invention is the method, further comprising situating the first contact on a first side of the device, and situating the second contact on a second side of the device, being opposite to the first side. As already described, the device may be produced from two substrates having an identical and/simple basic shape. The simple basic shape may be rectangle, i. e. square or oblong, for example. Thus, the number of different elements may be reduced, and the production process may be simplified and/or more flexible.

Another aspect of the invention is the method, further comprising situating the first contact on a first corner of the device and situating the second contact on a second corner of the device, being opposite to the first corner. As already described, the device may be produced from two substrates having an identical basic shape. Thus, the number of different elements may be reduced, and the production process may be simplified and/or more flexible.

Another aspect of the invention is the method, further comprising situating the first contact and the second contact on one corner of the device. As already described, the electrical wiring may be attached to the device at a single point. Thus, the production process may be further simplified.

Another aspect of the invention is the method, further comprising removing the first shape from a first blank substrate for obtaining the first space in the first substrate and/or removing the second shape from a second blank substrate for obtaining the second space in the second substrate. As already described, the substrates may be easily produced from blank substrates that are commercially available.

Another aspect of the invention is the article comprising the device, or a plurality of devices, or using the method.

According to an aspect of the invention, the article is a door, window, insulating glass window, wall or partition wall, a display or display screen. As a result, devices may be employed in a variety of articles. Moreover, the articles may be compatible to each other, such that they may be employed along with each other.

Another aspect of the invention is the use of the device, or plurality of devices, or the article, in a building, hall, house or tower, or a vehicle, motor vehicle, aircraft, spacecraft or watercraft.

All of the above aspects may be combined and each aspect may include one or more features mentioned in connection with any of the other aspects.

BRIEF DESCRIPTION OF THE SEVERAL VIEWS OF THE DRAWING

While the specification concludes with claims particularly pointing out and distinctly claiming that which is regarded as the invention, a more particular description of the invention will be rendered by reference to specific embodiments thereof, which are depicted in the appended drawing, in order to illustrate the manner in which embodiments of the invention are obtained. Understanding that the drawing depicts only typical embodiments of the invention, that are not necessarily drawn to scale, and, therefore, are not to be considered limiting of its scope, embodiments will be described and explained with additional specificity and detail through use of the accompanying drawing in which:

FIGS. 7 to 9 show a series of views illustrating production of a device 1; $1_1$, $1_2$ for controlling transmission of radiation according to another exemplary embodiment of the invention;

FIGS. 10 to 12 show a series of views illustrating production of a device 1; $1_1$, $1_2$ for controlling transmission of radiation according to yet another exemplary embodiment of the invention;

FIG. 21 shows views of an article 2 comprising devices 1; $1_1$, $1_2$ for controlling transmission of radiation according to exemplary embodiments of the invention.

DETAILED DESCRIPTION OF THE INVENTION

Figure 1:
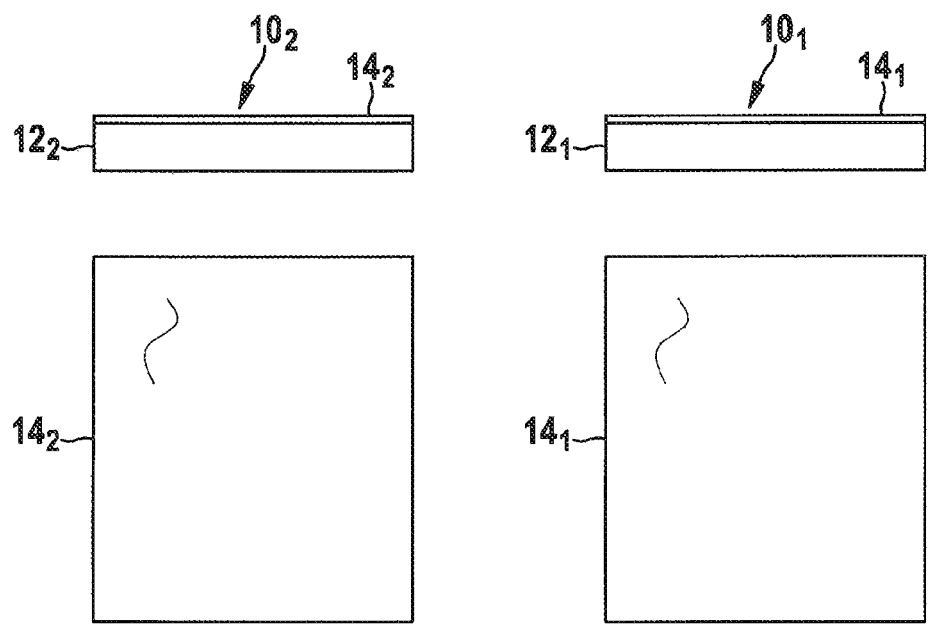
FIG. 1 shows views of blank substrates $10_1$, $10_2$ for a device 1; $1_1$, $1_2$ for controlling transmission of radiation according to exemplary embodiments of the invention.

In the detailed description of the embodiments, reference is made to the accompanying drawing which forms a part hereof and shows, by way of illustration, specific embodiments in which the invention may be practiced. In order to show the structures of the embodiments most clearly, the drawing included herein is a diagrammatic representation of inventive articles. Thus, actual appearance of the fabricated structures may appear different while still incorporating essential structures of embodiments. Moreover, the drawing shows only the structures necessary to understand the embodiments. Additional structures known in the art have not been included to maintain clarity of the drawings. It is also to be understood, that features and/or elements depicted herein are illustrated with particular dimensions relative to one another for purposes of simplicity and ease of understanding, and that actual dimensions may differ substantially from that illustrated herein. In the drawing, like numerals describe substantially similar components throughout the several views. The embodiments are intended to describe aspects of the invention in sufficient detail to enable those of skill in the art to practice the invention. Other embodiments may be utilized and structural, logical or electrical changes or combinations thereof may be made without departing from the scope of the invention.

Moreover, it is to be understood, that the various embodiments of the invention, although different, are not necessarily mutually exclusive. For example, a particular element, feature, structure, characteristic, integer or step, or group of elements, features, structures, characteristics, integers or steps described in one embodiment may be included within other embodiments. Furthermore, it is to be understood, that embodiments of the invention may be implemented using different technologies. Also, the term "exemplary" is merely meant as an example, rather than the best or optimal. The detailed description is, therefore, not to be taken in a limiting sense.

Throughout this specification the word "comprise" or variations such as "comprises" or "comprising", will be understood to imply the inclusion of a stated element, integer or step, or group of elements, integers or steps, but not the exclusion of any other element, integer or step, or group of elements, integers or steps.

In the description and claims, the terms "include", "have", "with" or other variants thereof may be used. It is to be understood, that such terms are intended to be inclusive in a manner similar to the term "comprise".

In the description and claims, the terms "coupled" and "connected", along with derivatives such as "communicatively coupled" may be used. It is to be understood, that these terms are not intended as synonyms for each other. Rather, in particular embodiments, "connected" may be used to indicate, that two or more elements are in direct physical or electrical contact with each other.

However, "coupled" may also mean that two or more elements are not in direct contact with each other, but yet still co-operate or interact with each other.

In the description and claims, terms, such as "upper", "lower", "first", "second", etc., may be only used for descriptive purposes and are not to be construed as limiting. The embodiments of a device or article described herein can be manufactured, used, or shipped in a number of positions and orientations.

FIG. 1 shows views of blank substrates $10_1$, $10_2$ for a device 1; $1_1$, $1_2$ for controlling transmission of radiation according to exemplary embodiments of the invention. The FIG. 1 comprises side views and top views, situated below corresponding side views.

A first blank substrate (substrate blank) $10_1$, shown on the right-hand side of FIG. 1, is a sheet of transparent glass $12_1$. One side, in FIG. 1 shown as top side, of the sheet of glass $12_1$ is coated with an ITO coating $14_1$. The first blank substrate (substrate blank) $10_1$ is commercially available.

A second blank substrate $10_2$, shown on the left-hand side of FIG. 1, is identical to the first blank substrate $10_1$.

FIGS. 2 to 5 show a series of views illustrating production of a device 1; $1_1$, $1_2$ for controlling transmission of radiation according to an exemplary embodiment of the invention.

Figure 2:
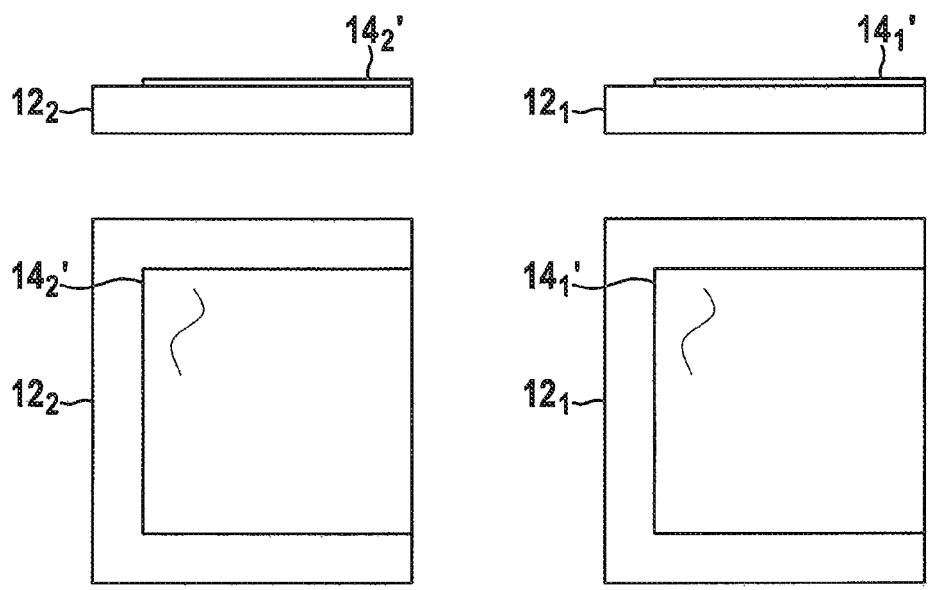
FIGS. 2 to 5 show a series of views illustrating production of a device 1; $1_1$, $1_2$ for controlling transmission of radiation according to an exemplary embodiment of the invention.

FIG. 2 shows views of substrates $12_1$, $12_2$ for the device 1; $1_1$, $1_2$ for controlling transmission of radiation according to the exemplary embodiment of the invention. The FIG. 2 comprises side views and top views, situated below corresponding side views.

A first substrate $12_1$, shown on the right-hand side of FIG. 2, is produced from the first blank substrate $10_1$ shown in FIG. 1. The ITO coating $14_1$ is shaped into a first conductive layer $14_1'$ by removing areas of the ITO coating $14_1$ at three sides, i. e. edges, of the first substrate $12_1$.

A second substrate $12_2$, shown on the left-hand side of FIG. 2, is identical to the first substrate $12_1$.

The first substrate $12_1$ and second substrate $12_2$ are cleaned, i. e. washed. Polyimide is applied to the top sides of the substrates $12_1$, $12_2$ in order to obtain polyimide layers (not shown in FIG. 2). The substrates $12_1$, $12_2$ are baked. The polyimide layers are rubbed in order to obtain alignment layers (not shown in FIG. 2).

Figure 3:
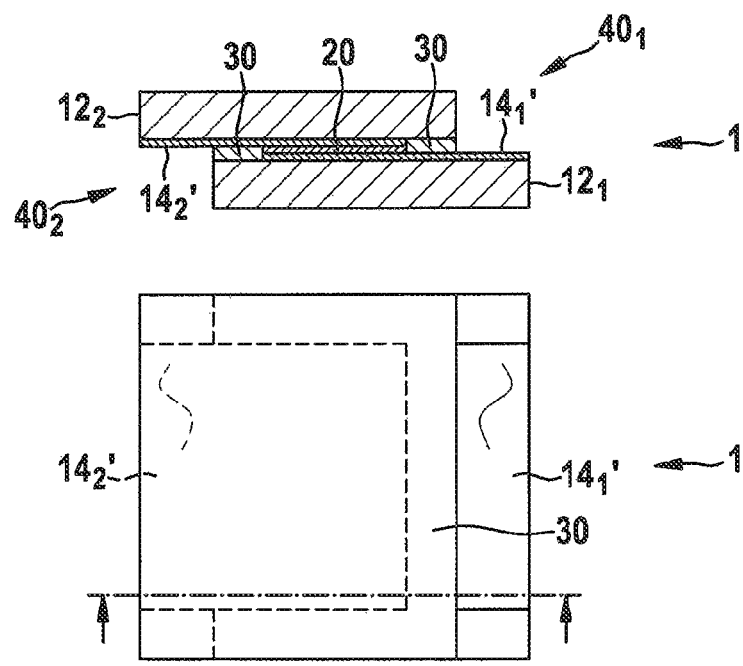

FIG. 3 shows views of a cell for the device 1; $1_1$, $1_2$ for controlling transmission of radiation according to the exemplary embodiment of the invention. The FIG. 3 comprises a cross-sectional side view and a top view, situated below the cross-sectional side view.

In order to obtain the cell, the second substrate $12_2$ is turned over and placed onto the first substrate $12_1$, such that the second conductive layer $14_1'$ faces the first conductive layer $14_1'$. However, the second substrate $12_2$ is displaced from the first substrate $12_1$ by an offset, such that a first area, i. e. first contact area, of the first conductive layer $14_1'$ at a first side of the first substrate $12_1$ and a second area, i. e. second contact area, of the second conductive layer $14_2'$ at a second side of the second substrate $12_2$ remain accessible at that opposing sides of the cell. Thus, the second substrate $12_2$ provides a first space $40_1$ above the first substrate $12_1$ and, vice versa, the first substrate $12_1$ provides a second space $40_1$ above (in FIG. 3 below) the second substrate $12_2$.

The cell further comprises, between the first substrate $12_1$ and the second substrate $12_2$, an active layer 20 changing its light transmissivity dependent on an electrical filed between the conductive layers $14_1'$, $14_2'$ and a spacer 30. The active layer 20 may, for example, be between 1 μm and 50 μm, such as 25 μm wide and comprise a dye-doped liquid crystal mixture. The spacer 30 surrounds the active layer 20, keeps the substrates $12_1$, $12_2$ apart from each other and/or isolates the conductive layers $14_1'$, $14_2'$ from each other.

Figure 4:
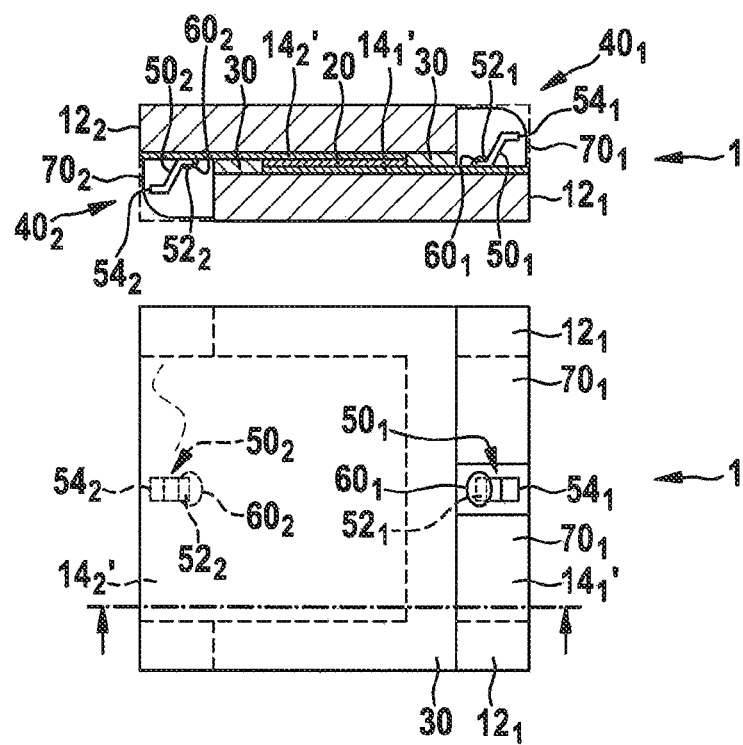
Figure 5:
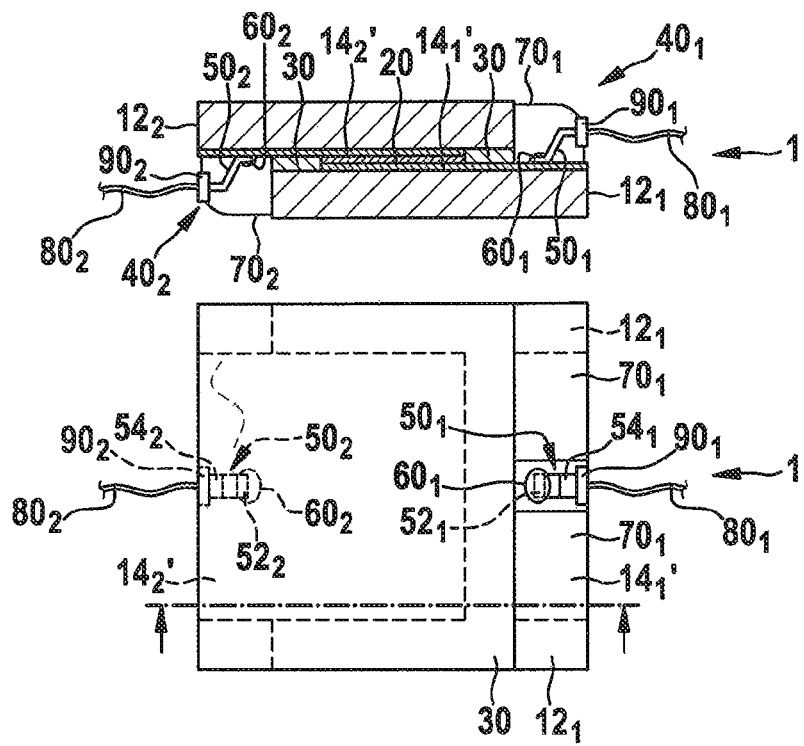

FIGS. 4 and 5 show views of the device 1; $1_1$, $1_2$ for controlling transmission of radiation according to the exemplary embodiment of the invention. The FIGS. 4 and 5 comprise cross-sectional side views and top views, situated below corresponding cross-sectional side views.

As shown in FIG. 4, a first contact $50_1$ is attached, in the first area, to the first conductive layer $14_1'$. In more detail, the first contact $50_1$ is located in the first space $40_1$, and a first portion $60_1$ of an thermally curable conductive adhesive attaches a first proximal end $52_1$ of the first contact $50_1$ to the first conductive layer $14_1'$. The adhesive is commercially available; it is the product EPO-TEK H20E by Epoxy Technology, Inc., www.epotek.com. As shown, the first portion $60_1$ of adhesive may enclose the first proximal end $52_1$ of the first contact $50_1$. Alternatively, the first portion $60_1$ of adhesive may be situated between the first proximal end $52_1$ and the first contact $50_1$.

The first contact $50_1$ may be attached to the first conductive layer $14_1'$ at a suitable position of a plurality of positions along the side of the first substrate $12_1$. As shown in FIG. 4, the first contact $50_1$ may be attached to the first conductive layer $14_1'$ at a centre position. Thus, an even, or a least symmetrical, voltage distribution over the first conductive layer $14_1'$ may be achieved. The centre position may be chosen in particular, when a resistance of the first conductive layer $14_1'$ is not sufficiently low.

As the adhesive and other materials, e. g. the material of the spacer 30, are chosen to have the curing conditions, e. g. temperature and duration, the device 1; $1_1$, $1_2$ is compatible with a conventional glazing system, e. g. window, insulating glass window or laminated glass window. Thus, the device 1; $1_1$, $1_2$ can be processed using standard processes already established in the glazing industry for processing conventional glazing systems.

Alternatively, the first contact $50_1$ may be attached to the first conductive layer $14_1'$ before the second substrate $12_2$ is turned over and placed onto the first substrate $12_1$.

A second contact $50_2$ is identically attached, in the second area, to the second conductive layer $14_2'$.

As the first contact $50_1$ and the second contact $50_2$ are, as indicated in FIG. 4 by a dashed line, contained within the contour of the device 1; $1_1$, $1_2$, the device 1; $1_1$, $1_2$ is compatible with a conventional glazing system, e. g. window, insulating glass window or laminated glass window. Thus, the device 1; $1_1$, $1_2$ can be processed using standard processes already established in the glazing industry for processing conventional glazing systems.

A first seal $70_1$ and a second seal $70_2$ are applied to the first space $40_1$ and the second space $40_2$, respectively, in order to environmentally seal the cell. The seals $70_1$, $70_2$ are commercially available; they are made of the translucent RTV silicone adhesive sealant paste AS1745T, Amber Chemical Company (ACC) Ltd, www.acc-silicones.com.

As shown in FIG. 5, the first contact $50_1$ may be housed in a first connector $90_1$. The first connector $90_1$ is commercially available; it is the product Pico-EZmate wire-to-board connector system part no. 78171-002 by Molex, Inc., www.molex.com.

A first wiring $80_1$ is connected to the first distal end $54_1$ of the first contact $50_1$ and a second wiring $80_2$ is connected to the second distal end $54_2$ of the second contact $50_2$ in order to couple the device 1; $1_1$, $1_2$ to a driver circuit or power supply.

Figure 6:
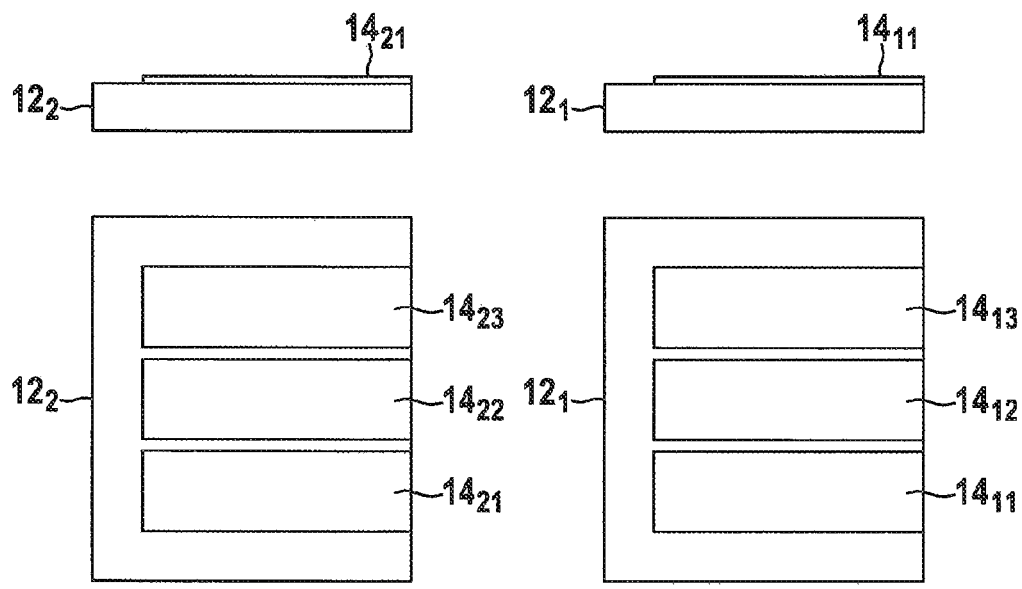
FIG. 6 shows views of substrates $12_1$, $12_2$ for a modified device 1; $1_1$, $1_2$ for controlling transmission of radiation according to the exemplary embodiment of the invention.

FIG. 6 shows views of substrates $12_1$, $12_2$ for a modified device 1; $1_1$, $1_2$ for controlling transmission of radiation according to the exemplary embodiment of the invention. The FIG. 6 comprises side views and top views, situated below corresponding side views.

A first substrate $12_1$, shown on the right-hand side of FIG. 6, is produced from the first blank substrate $10_1$ shown in FIG. 1. The ITO coating $14_1$ is shaped into a conductive layer comprising a first plurality of conductive segments $14_{11}$, ... $14_{13}$ by removing areas of the ITO coating $14_1$ at three sides, i. e. edges, of the first substrate $12_1$ and between the segments $14_{11}$, ... $14_{13}$.

A second substrate $12_2$, shown on the left-hand side of FIG. 6, is identical to the first substrate $12_1$.

The modified device 1; $1_1$, $1_2$ is produced as described with reference to FIGS. 2 to 5 for the device 1; $1_1$, $1_2$.

FIGS. 7 to 9 show a series of views illustrating production of a device 1; $1_1$, $1_2$ for controlling transmission of radiation according to another exemplary embodiment of the invention.

FIG. 7 shows views of substrates $12_1'$, $12_2'$ for the device 1; $1_1$, $1_2$ for controlling transmission of radiation according to the other exemplary embodiment of the invention. The FIG. 7 comprises side views and top views, situated below corresponding side views.

A first substrate $12_1'$, shown on the right-hand side of FIG. 7, is produced from the first blank substrate $10_1$ shown in FIG. 1. The ITO coating $14_1$ is shaped into a first conductive layer $14_1'$ comprising a first contact area in a first corner of the first substrate $12_1'$ and another contact area in another corner being opposite to the first corner by removing areas of the ITO coating $14_1$ at four sides, i. e. edges, a third corner of the first substrate $12_1$, and a fourth corner being opposite to the third corner in order to provide for two contacts per substrate $12_1'$, $12_2'$.

At the third corner, a first right-angled triangle $12_1''$ comprising a first leg having a first length and a second leg having a second length being 1.0 of the first length is removed, i. e. cut away, and discarded in order to obtain a first space $40_1$ in the first substrate $12_1$'. As shown in FIG. 7, the first triangle has one angle of 90° and two angles of 45°. Similarly, at the fourth corner, a second right-angled triangle $12_1$" is removed. Alternatively, the corners may be removed before the ITO coating $14_1$ is shaped.

In the side view, after discard of the first right-angled triangle $12_1$" the third corner of the first substrate $12_1$' and the removed area of the ITO coating along the left-hand side of the first substrate $12_1$' are indicated by vertical continuous lines on the left-hand side of the first substrate $12_1$' and first conductive layer $14_1$', and after discard of the second right-angled triangle $12_1$" the fourth corner of the first substrate $12_1$', situated behind the first substrate $12_1$', and the contact area are indicated by a vertical dashed line on the right-hand side of the first substrate $12_1$' and a vertical continuous line on the right-hand side of the first conductive layer $14_1$', respectively.

A second substrate $12_2$' shown on the left-hand side of FIG. 7, is identical to the first substrate $12_1$'. In the side view, after discard of the first right-angled triangle $12_2$" the third corner of the second substrate $12_2$' and the removed area of the ITO coating along the left-hand side of the second substrate $12_2$' are indicated by vertical continuous lines on the left-hand side of the second substrate $12_2$' and second conductive layer $14_2$', and after discard of the second right-angled triangle $14_2$" the fourth corner of the second substrate $12_2$', situated behind the second substrate $12_2$', and the contact area are indicated by a vertical dashed line on the right-hand side of the second substrate $12_2$' and a vertical continuous line on the right-hand side of the second conductive layer $14_2$', respectively.

The first substrate $12_1$' and second substrate $12_2$' are cleaned and processed as described with reference to FIG. 2.

FIG. 8 shows views of a cell for the device 1; $1_1$, $1_2$ for controlling transmission of radiation according to the other exemplary embodiment of the invention. The FIG. 8 comprises a side view and top view, situated below the side view.

In order to obtain the cell, the second substrate $12_2$' is turned over and placed onto the first substrate $12_1$', such that the second conductive layer $14_1$' faces the first conductive layer $14_1$' as described with reference to FIG. 3. However, the second substrate $12_2$' is aligned with the first substrate $12_1$', such that the first contact area of the first conductive layer $14_1$' in the first corner of the first substrate $12_1$' remains accessible via the second space $40_2$ in the second substrate $12_2$' and the second area of the second conductive layer $14_2$' in the second corner of the second substrate $12_2$' remains accessible via the first space $40_1$ in the first substrate $12_1$'.

The cell further comprises an active layer (not shown in FIG. 8) and a spacer 30 as described with reference to FIG. 3. The spacer 30 surrounds the active layer along the sides of the substrates $12_1$', $12_2$', keeps the substrates $12_1$', $12_2$' apart from each other and/or isolates the conductive layers $14_1$', $14_2$' from each other.

In the top view, after turning over and placing the second substrate $12_2$' onto the first substrate $12_1$', the second conductive layer $14_2$' of the second substrate $12_2$' is indicated by dashed lines. Features on levels under the second conductive layer $14_2$' of the device 1; $1_1$, $1_2$, for example the active layer and the first conductive layer $14_1$', are not shown to maintain clarity of the figure.

In the side view, the third corner of the first substrate $12_1$' and the removed area of the ITO coating along the left-hand side of the first substrate $12_1$' are indicated by vertical continuous lines on the left-hand side of the first substrate $12_1$' and first conductive layer $14_1$', and the fourth corner of the first substrate $12_1$', situated behind the first substrate $12_1$', and the contact area are indicated by a vertical dashed line on the right-hand side of the first substrate $12_1$' and a vertical continuous line on the right-hand side of the first conductive layer $14_1$', respectively. Similarly, after turning over and placing the second substrate $12_2$' onto the first substrate $12_1$', the third corner of the second substrate $12_2$' and the removed area of the ITO coating along the now right-hand side of the second substrate $12_2$' are indicated by vertical continuous lines on the now right-hand side of the second substrate $12_2$' and second conductive layer $14_2$', and the fourth corner of the second substrate $12_2$', situated behind the second substrate $12_2$', and the contact area are indicated by a vertical dashed line on the now left-hand side of the second substrate $12_2$' and a vertical continuous line on the now left-hand side of the second conductive layer $14_2$', respectively. The spacer 30 is situated between the substrates $12_1$', $12_2$'. Features within the spacer 30 of the device 1; $1_1$, $1_2$, for example the active layer, and the conductive layers $14_1$', $14_2$', are not shown to maintain clarity of the figure.

FIG. 9 shows views of the device 1; $1_1$, $1_2$ for controlling transmission of radiation according to the other exemplary embodiment of the invention. The FIG. 9 comprises a side view and top view, situated below the side view.

With reference to FIG. 9, a first contact $50_1$ is attached, in the first contact area, to the first conductive layer $14_1$' and a second contact $50_2$ is attached, in the second contact area, to the second conductive layer $14_2$' as described with reference to FIG. 4. Alternatively, the contacts $50_1$, $50_2$ may be attached before the second substrate $12_2$' is turned over and placed onto the first substrate $12_1$'.

In the side view, the third corner of the first substrate $12_1$' is indicated by a vertical continuous line on the left-hand side of the first substrate $12_1$', and the fourth corner of the first substrate $12_1$', situated behind the first substrate $12_1$', and the contact area are indicated by a vertical dashed line on the right-hand side of the first substrate $12_1$' and a vertical continuous line on the right-hand side of the first conductive layer $14_1$', respectively. Similarly, the third corner of the second substrate $12_2$' is indicated by a vertical continuous line on the now right-hand side of the second substrate $12_2$', and the fourth corner of the second substrate $12_2$', situated behind the second substrate $12_2$', and the contact area are indicated by a vertical dashed line on the now left-hand side of the second substrate $12_2$' and a vertical continuous line on the now left-hand side of the second conductive layer $14_2$', respectively. The spacer 30 is situated between the substrates $12_1$', $12_2$'. Features within the spacer 30 of the device 1; $1_1$, $1_2$, for example the active layer, and the conductive layers $14_1$', $14_2$', are not shown to maintain clarity of the figure.

FIGS. 10 to 12 show a series of views illustrating production of a device 1; $1_1$, $1_2$ for controlling transmission of radiation according to yet another exemplary embodiment of the invention.

FIG. 10 shows views of substrates $12_1$', $12_2$' for the device 1; $1_1$, $1_2$ for controlling transmission of radiation according to the yet other exemplary embodiment of the invention. The FIG. 10 comprises side views and top views, situated below corresponding side views.

A first substrate $12_1$', shown on the right-hand side of FIG. 7, is produced from the first blank substrate $10_1$ shown in FIG. 1. The ITO coating $14_1$ is shaped into a first conductive layer $14_1$' comprising a first contact area in a first corner of the first substrate $12_1$' by removing areas of the ITO coating $14_1$ at four sides, i. e. edges, and three corners.

At the first corner, a first right-angled triangle $12_1$" comprising a first leg having a first length and a second leg having a second length being √3 of the first length is removed, i. e. cut away, and discarded in order to obtain a first space $40_1$ in the first substrate $12_1'$. As shown in FIG. 7, the first triangle has one angle of 90°, one angle of 30° and one angle of 60°. Alternatively, the corner may be removed before the ITO coating $14_1$ is shaped.

A second substrate $12_2'$ shown on the left-hand side of FIG. 10, is similar to the first substrate $12_1'$. However, the second substrate $12_2'$ with the second conductive layer $14_2'$ is a mirror image of the first substrate $12_1'$ with the first conductive layer $14_1'$, and the second triangle $12_2''$, i. e. second space $40_2$, is a flipped version of the first triangle $12_1''$, i. e. first space $40_1$.

In the side view, after discard of the first right-angled triangle $12_1''$ the first corner of the first substrate $12_1'$ is indicated by a vertical continuous line on the left-hand side of the first substrate $12_1'$. Moreover, with reference to the corresponding top view, the removal of the areas of the ITO coating along the left-hand side and right-hand side of the first substrate $12_1'$ is visible, and the first contact area is indicated by a vertical continuous line on the left-hand side of the first conductive layer $14_1'$. Similarly, after discard of the second right-angled triangle $12_2''$ the second corner of the second substrate $12_1'$ is indicated by a vertical continuous line on the right-hand side of the second substrate $12_2'$. Moreover, with reference to the corresponding top view, the removal of the area of the ITO coating along the left-hand side side of the second substrate $12_2'$ is visible, and the second contact area is indicated by a vertical continuous line on the right-hand side of the second conductive layer $14_2'$.

FIGS. 11 and 12 show enlarged views of the device 1; $1_1$, $1_2$ for controlling transmission of radiation according to yet other the exemplary embodiment of the invention. The FIGS. 11 and 12 comprise side views and top views, situated below corresponding side views.

In order to obtain the cell, the second substrate $12_2'$ is turned over and placed onto the first substrate $12_1'$, such that the second conductive layer $14_1'$ faces the first conductive layer $14_1'$ as described with reference to FIG. 3, and that the second substrate $12_2'$ is aligned with the first substrate $12_1'$, as further described with reference to FIG. 8. However, the first contact area of the first conductive layer $14_1'$ and the second area of the second conductive layer $14_2'$ remain accessible via the second space $40_2$ and the first space $40_1$, both of which being located in a single corner of the device 1; $1_1$, $1_2$.

The cell further comprises an active layer (not shown in FIGS. 11 and 12) and a spacer 30 as described with reference to FIG. 3. The spacer 30 surrounds the active layer along the sides of the substrates $12_1'$, $12_2'$, keeps the substrates $12_1'$, $12_2'$ apart from each other and/or isolates the conductive layers $14_1'$, $14_2'$ from each other.

In the top view, after turning over and placing the second substrate $12_2'$ onto the first substrate $12_1'$, the second conductive layer $14_2'$ of the second substrate $12_2'$ is indicated by dashed lines. Features on levels under the second conductive layer $14_2'$ of the device 1; $1_1$, $1_2$, for example the active layer and the first conductive layer $14_1'$, are not shown to maintain clarity of the figure.

In the side view, the first corner of the first substrate $12_1'$ is indicated by a vertical continuous line on the left-hand side of the first substrate $12_1'$. Similarly, after turning over and placing the second substrate $12_2'$ onto the first substrate $12_1'$, the second corner of the second substrate $12_2'$ is indicated by a vertical continuous line on the now left-hand side of the second substrate $12_2'$. The spacer 30 is situated between the substrates $12_1'$, $12_2'$ and the first contact area of the first conductive layer $14_1'$ and the second area of the second conductive layer $14_2'$. Features within the spacer 30 of the device 1; $1_1$, $1_2$, for example the active layer, and the conductive layers $14_1'$, $14_2'$, are not shown to maintain clarity of the figure.

With reference to FIG. 12, a first contact $50_1$ is attached, in the first contact area, to the first conductive layer $14_1'$ and a second contact $50_2$ is attached, in the second contact area, to the second conductive layer $14_2'$ as described with reference to FIGS. 4 and 9. Alternatively, the contacts $50_1$, $50_2$ may be attached before the second substrate $12_2'$ is turned over and placed onto the first substrate $12_1'$.

As the first contact $50_1$ and the second contact $50_2$ are, as indicated in FIG. 12 by a dashed line, contained within the contour of the device 1; $1_1$, $1_2$, the device 1; $1_1$, $1_2$ is compatible with a conventional glazing system, e. g. window, insulating glass window or laminated glass window. Thus, the device 1; $1_1$, $1_2$ can be processed using standard processes already established in the glazing industry for processing conventional glazing systems.

Thus, the first wiring $80_1$ may be connected to the first distal end $54_1$ of the first contact $50_1$ and the second wiring $80_2$ may connected to the second distal end $54_2$ of the second contact $50_2$ in only one corner of the device 1; $1_1$, $1_2$. Thus, as both the first contact $50_1$ and the second contact $50_2$ are situated in the same corner of the device 1; $1_1$, $1_2$, only this corner, or one side, of the device 1; $1_1$, $1_2$ needs to be accessible.

As shown in FIG. 12, the first contact $50_1$ is situated in the second space $40_2$ and the second contact $50_2$ is situated in the first space $40_1$, and the contacts $50_1$, $50_2$ are oriented perpendicularly to each other. Alternatively, in a modified device 1; $1_1$, $1_2$, using modified contacts distal ends $54_1$, $54_2$ may be arranged in parallel to each other in a single housing, such that the wiring may be connected in a single step.

In the top view, after turning over and placing the second substrate $12_2'$ onto the first substrate $12_1'$, the second conductive layer $14_2'$ of the second substrate $12_2'$ is indicated by dashed lines. Features on levels under the second conductive layer $14_2'$ of the device 1; $1_1$, $1_2$ are not shown to maintain clarity of the figure.

In the side view, the first corner of the first substrate $12_1'$ is indicated by a vertical continuous line on the left-hand side of the first substrate $12_1'$. Similarly, after turning over and placing the second substrate $12_2'$ onto the first substrate $12_1'$, the second corner of the second substrate $12_2'$ is indicated by a vertical continuous line on the now left-hand side of the second substrate $12_2'$. The spacer 30 is situated between the substrates $12_1'$, $12_2'$ and the first contact area of the first conductive layer $14_1'$ and the second area of the second conductive layer $14_2'$.

Figure 13:
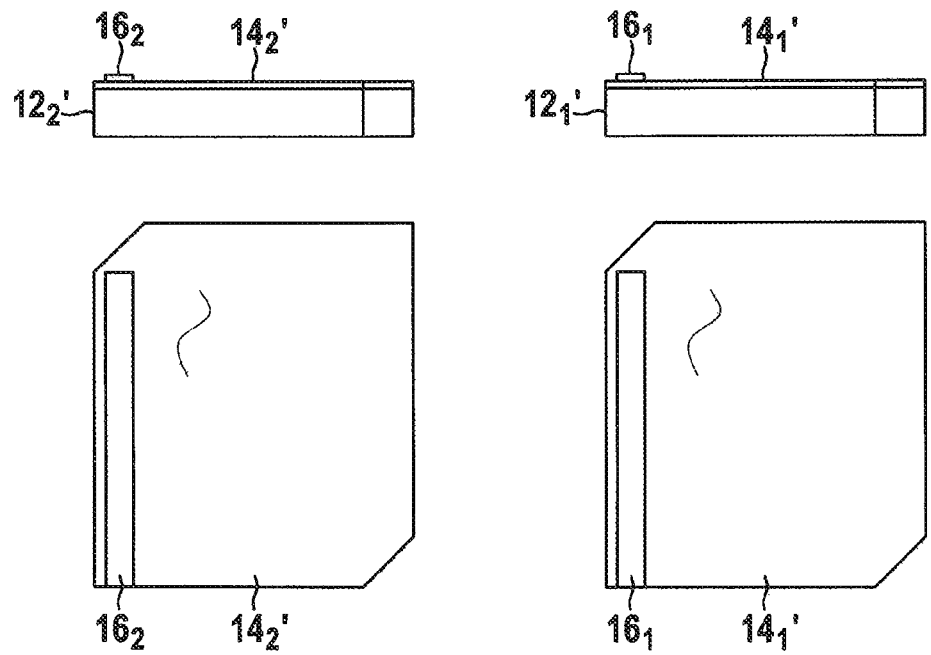
FIGS. 13 and 14 show a series of views illustrating production of a device 1; $1_1$, $1_2$ for controlling transmission of radiation according to yet another exemplary embodiment of the invention.
Figure 14:
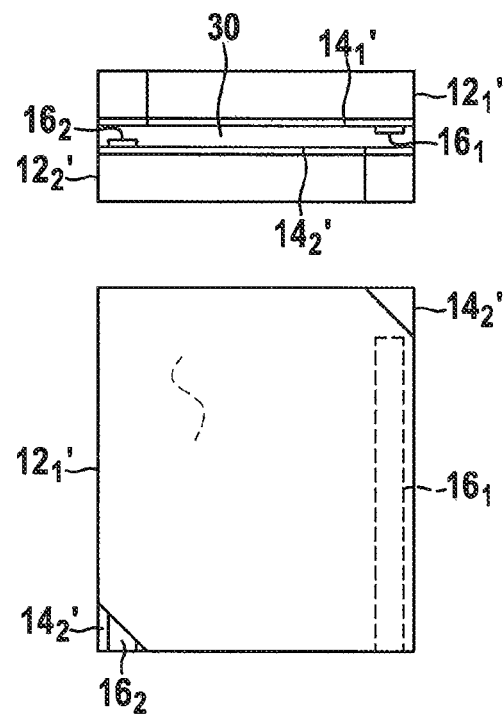

FIGS. 13 and 14 show a series of views illustrating production of a device 1; $1_1$, $1_2$ for controlling transmission of radiation according to yet another exemplary embodiment of the invention. The FIGS. 13 and 14 comprise side views and top views, situated below corresponding views.

With reference to FIG. 13, a first and a second identical, ITO-coated glass substrate $12_1'$, $12_2'$, each of which having a glass thickness of 3 mm, are cut to a size of 300 mm×300 mm with two opposing edges removed and cleaned. For both substrates $12_1'$, $12_2'$, a busbar $16_1$, $16_2$ is printed on the ITO layer $14_1'$, $14_2'$ using a conductive material, the product APP11 by DuPont, Inc. (or alternative silver conductive ink, which can be identified using the conductive ink selection guide offered by DuPont under www.dupont.com), along a left-hand side of the substrate $12_1'$, $12_2'$, 1 mm from the left-hand side and between a bottom side of the substrate $12_1'$, $12_2'$ and the edge removed from the substrate $12_1'$, $12_2'$ and with a width of 3 mm and a height of approximately 10 µm.

With reference to FIG. 14, an empty liquid-crystal cell is manufactured from the two substrates $12_1'$, $12_2'$ using a method as generally known in the art. The two substrates $12_1'$, $12_2'$ are paired such that the busbars $16_1$, $16_2$ are located on opposite sides (busbar sides) of the liquid-crystal cell. The busbar $16_1$ on the first substrate $12_1'$ is indicated by dashed lines. Features on levels under the busbar $16_1$ on the first substrate $12_1'$, for example concealed features on the second substrate $12_2'$, are not shown to maintain clarity of the figure.

Moreover, the substrates $12_1'$, $12_2'$ are paired such that all four sides of the substrates $12_1'$, $12_2'$ are exactly paired. Thus, the resulting liquid-crystal cell has a size of 300 mm×300 mm and a thickness of approximately 6 mm, and each of the two busbars $16_1$, $16_2$ on the first substrate $12_1'$ and the second substrate $12_2'$ has, on the bottom sides of the substrates $12_1'$, $12_2'$, where corresponding edges of the second substrate $12_2'$ and the first substrate $12_1'$, respectively, are removed, an exposed end. A filling port is left in a main sealant 30 on one of the two longer sides of the liquid-crystal cell. The liquid-crystal cell is filled with a dye-doped liquid crystal using a vacuum filling process, and the filling port is sealed using an UV curable sealant.

As will be explained with reference to FIG. 20, at the exposed end of each of the two busbars $16_1$, $16_2$, drops of a conductive adhesive/sealant, the product EPO-TEK H20E, may be applied with a spatula to form conductive adhesive spots $60_1$, $60_2$. Two one-terminal wire-to-board connectors 90, the products Pico-EZmate part no. 78171-001, may be placed on each of the conductive adhesive spots $60_1$, $60_2$. To cure the conductive adhesive/sealant, the liquid-crystal cell is placed in an oven and heated at 140° C. for a period of 20 minutes.

The liquid-crystal cell is now ready for further processing. A small piece of protective tape, the product Kapton polyimide film by DuPont, may be applied over the wire-to-board connectors 90 to prevent any unwanted material from polluting the wire-to-board connectors 90. A third glass substrate having a size of 300 mm×300 mm, may be laminated with a polyvinyl butyral (PVB) foil, having a thickness of 0.76 mm, to the liquid-crystal cell in a vacuum laminating system at 140° C. The laminated liquid-crystal cell may then be processed into an insulated glass unit by attaching an aluminium spacer bar, having a width of 16 mm and a thickness of 5.5 mm and being bend into a rectangular shape having inner dimensions of 276 mm×276 mm. The third glass substrate laminated to the liquid-crystal cell may be positioned towards an outside of the insulating glass unit. The spacer bar may be attached to the glass using an isobutyl sealant between the spacer and the glass. A fourth glass substrate may be used to complete the insulating glass unit. The cavity created by the spacer bar may be filled with argon gas. The area between the spacer bar and a perimeter of the glass substrate may be filled with a polysulfite sealant. When the polysulfite sealant has cured, after approximately 24 hours, the wire-to-board connector 90 now inside the insulated glass unit may be freed by cutting away any excess polysulfite sealant with a knife and removing the protective tape.

Two cable assemblies each of which comprising an insulated copper wire 80 and a one-terminal receptical housing 95, the product Pico-EZmate part no. 78172-001 by Molex, Inc., may be placed in the wire-to-board connectors 90 inside the insulated glass unit. These complete interconnections may be sealed with a silicone sealant, the product AS1745T.

Figure 15:
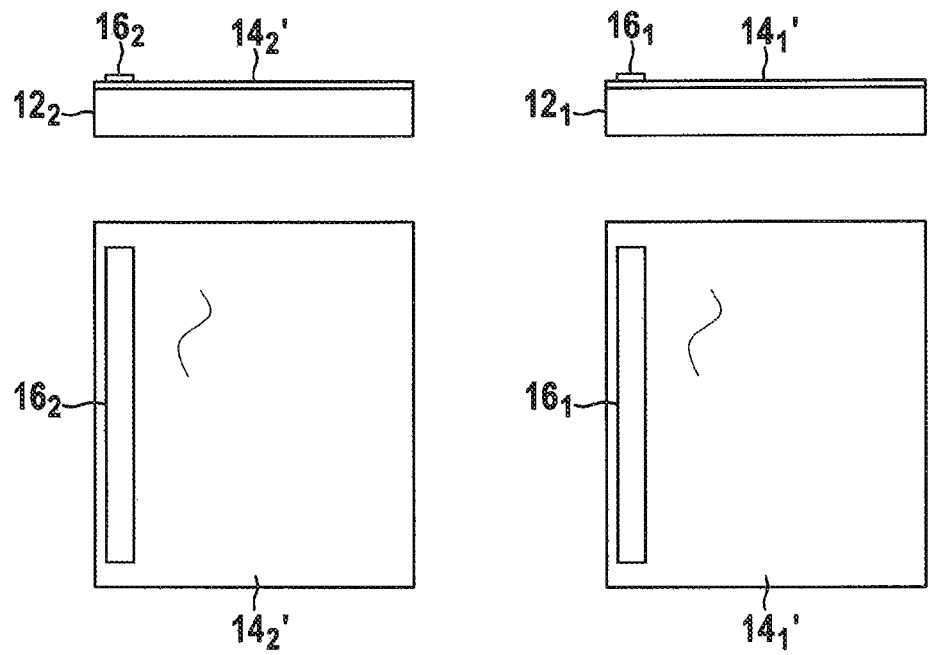
FIGS. 15 and 16 show a series of views illustrating production of a device 1; $1_1$, $1_2$ for controlling transmission of radiation according to a working example of the invention.
Figure 16:
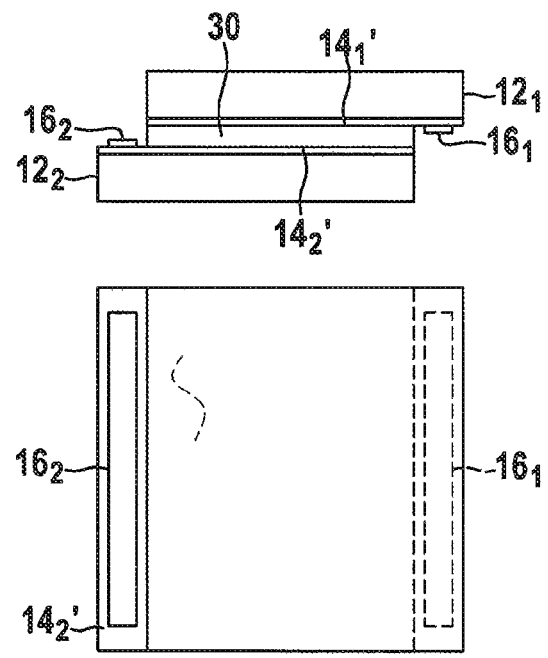

FIGS. 15 and 16 show a series of views illustrating production of a device 1; $1_1$, $1_2$ for controlling transmission of radiation according to a working example of the invention. The FIGS. 15 and 16 comprise side views and top views, situated below corresponding views.

With reference to FIG. 15, a first and a second identical, ITO-coated glass substrate $12_1$, $12_2$, each of which having a glass thickness of 3 mm, are cut to a size of 300 mm×300 mm and cleaned. For both substrates $12_1$, $12_2$, a busbar $16_1$, $16_2$ is printed on the ITO layer $14_1$, $14_2$ using a conductive material, the product APP11 (or alternative silver conductive ink, which can be identified using the conductive ink selection guide offered by DuPont under www.dupont.com), over a complete length of one side of the substrate $12_1$, $12_2$, 1 mm from the substrate edge and with a width of 3 mm and a height of approximately 10 µm.

With reference to FIG. 16, an empty liquid-crystal cell is manufactured from the two substrates $12_1$, $12_2$ using a method as generally known in the art. The two substrates $12_1$, $12_2$ are paired such that the busbars $16_1$, $16_2$ are located on opposite sides (busbar sides) of the liquid-crystal cell. The busbar $16_1$ on the first substrate $12_1$ and the right-hand side of the second substrate $12_2$ are indicated by dashed lines.

Moreover, the substrates $12_1$, $12_2$ are paired with a 5 mm off-set on the busbar sides such that both busbars $16_1$, $16_2$ remain exposed, whereas the two remaining sides of the substrates $12_1$, $12_2$ that do not have busbars are exactly paired. Thus, the resulting liquid-crystal cell has a size of 300 mm×305 mm and a thickness of approximately 6 mm. A filling port is left in a main sealant 30 on one of the two longer sides of the liquid-crystal cell. The liquid-crystal cell is filled with a dye-doped liquid crystal using a vacuum filling process, and the filling port is sealed using an UV curable sealant.

As will be explained with reference to FIG. 20, at an exposed end of each of the two busbars $16_1$, $16_2$, drops of a conductive adhesive/sealant, the product EPO-TEK H20E, are applied with a spatula to form conductive adhesive spots $60_1$, $60_2$. A two-terminal wire-to-board connector 90, the product Pico-EZmate part no. 78171-002, is placed on each of the conductive adhesive spots $60_1$, $60_2$. To cure the conductive adhesive/sealant, the liquid-crystal cell is placed in an oven and heated at 140° C. for a period of 20 minutes.

The liquid-crystal cell is now ready for further processing. A small piece of protective tape, the product Kapton polyimide film by DuPont, is applied over the wire-to-board connector 90 to prevent any unwanted material from polluting the wire-to-board connector 90. A third glass substrate having a size of 300 mm×300 mm, is laminated with a PVB foil, having a thickness of 0.76 mm, to the liquid-crystal cell in a vacuum laminating system at 140° C. The laminated liquid-crystal cell is then processed into an insulated glass unit by attaching an aluminium spacer bar, having a width of 16 mm and a thickness of 5.5 mm and being bend into a rectangular shape having inner dimensions of 281 mm×276 mm. The third glass substrate laminated to the liquid-crystal cell is positioned towards an outside of the insulating glass unit. The spacer bar is attached to the glass using an isobutyl sealant between the spacer and the glass. A fourth glass substrate is used to complete the insulating glass unit. The cavity created by the spacer bar is filled with argon gas. The area between the spacer bar and a perimeter of the glass substrate is filled with a polysulfite sealant. When the polysulfite sealant has cured, after approximately 24 hours, the wire-to-board connector 90 now inside the insulated glass unit is freed by cutting away any excess polysulfite sealant with a knife and removing the protective tape.

A cable assembly comprising two insulated copper wires 80 and a two-terminal receptical housing 95, the product Pico-EZmate part no. 78172-002 by Molex, Inc., is placed in the wire-to-board connector 90 inside the insulated glass unit. This complete interconnection is sealed with a silicone sealant, the product AS1745T.

FIGS. 17 to 20 show a series of views illustrating production of a device 1; $1_1$, $1_2$ for controlling transmission of radiation according to another working example of the invention. The FIGS. 17 and 19 comprise side views and top views, situated below corresponding views. The FIGS. 19 and 20 comprise, with reference to a first intersection line A-A and a second intersection line B-B shown in FIG. 18, respectively, partial enlarged cross-sectional side views.

Figure 17:
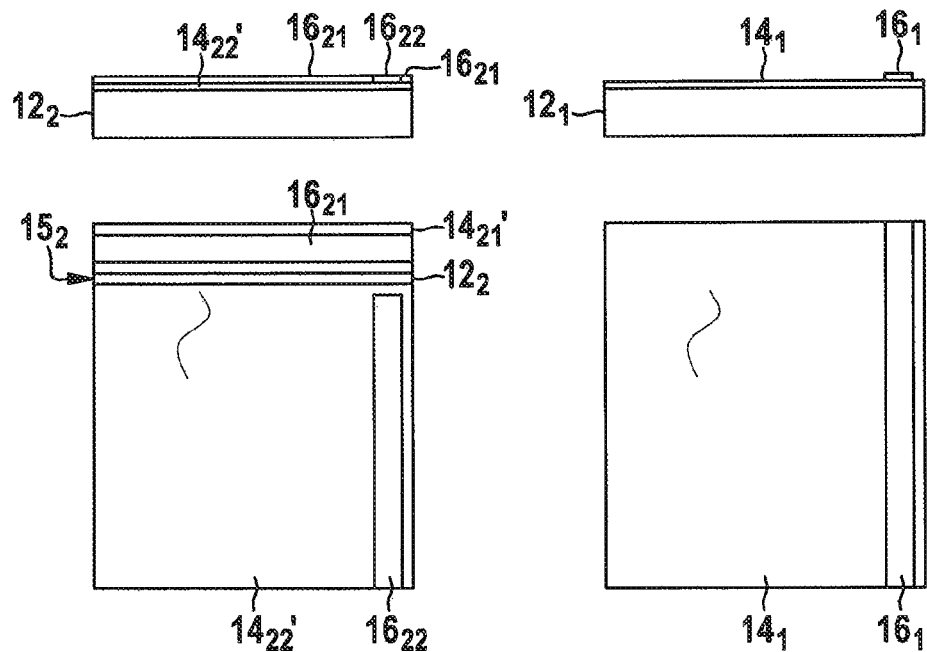
FIGS. 17 to 20 show a series of views illustrating production of a device 1; $1_1$, $1_2$ for controlling transmission of radiation according to another working example of the invention.

With reference to FIG. 17, a first and a second ITO-coated glass substrate $12_1$, $12_2$, each of which having a glass thickness of 3 mm, are cut to size: the first substrate $12_1$ is cut to a size of 300 mm×300 mm and the second substrate $12_2$ is cut to a size of 308 mm×300 mm (width×length). The second substrate $12_2$ is treated with an ablation laser to remove a part $15_2$ of the ITO coating $14_2$ along a line having a width of 50 µm, being positioned approximately 8 mm from a top side of the second substrate $12_2$ and stretching over the complete width of the second substrate $12_2$. This creates two electrically separated ITO areas $14_{21}'$, $14_{22}'$ on the second substrate $12_2$, having an electrical insulation between the first ITO area $14_{21}'$ and second ITO area $14_{22}'$ of more than 10 MΩ.

On the first substrate $12_1$, a busbar $16_1$, having a width of 3 mm and/or a height of approximately 10 µm, is printed onto the ITO coating $14_1$. It is positioned over the full length of the substrate, 3 mm from the edge.

On the second substrate $12_2$, a first busbar $16_{21}$ and a second busbar $16_{22}$ are printed onto the first and second ITO areas $14_{21}'$, $14_{22}'$, respectively, using a conductive material, the product APP11 (or alternative silver conductive ink, which can be identified using the conductive ink selection guide offered by DuPont under www.dupont.com). The first busbar $16_{21}$, having a width of 3 mm and/or a height of approximately 10 µm, is printed onto the first ITO area $14_{21}'$ along the top side of the second substrate $12_2$, 3 mm from the top side and over the complete width of the second substrate $12_2$. The second busbar $16_{22}$, having a width of 3 mm and/or a height of approximately 10 µm, is printed onto the second area $14_{22}'$ along a right-hand side of the second substrate $12_2$, 3 mm from the right-hand side and between a bottom side of the second substrate $12_2$ and 8 mm from the top side of the second substrate $12_2$, such that the second busbar $16_{22}$ does not create an electrical connection between the first and second ITO areas $14_{21}$, $14_{22}$.

Figure 18:
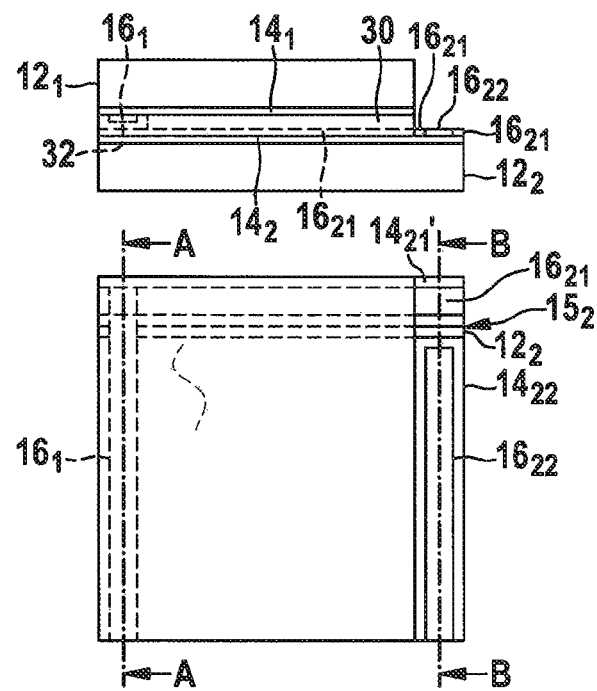

With reference to FIG. 18, an empty liquid-crystal cell is manufactured from the two substrates $12_1$, $12_2$ using the methods as generally known in the art. Polyimide is printed on both substrates $12_1$, $12_2$ and rubbed using a velvet cloth. A main sealant is deposited on the first substrate $12_1$, 8 mm from edges of the first substrate $12_1$. The busbar $16_1$ on the first substrate $12_1$ and the first busbar $16_{21}$ on the second substrate $12_2$ as well as the part $15_2$ of removed ITO coating $14_2$ and a dot 32 of conductive adhesive/sealant are indicated by dashed lines.

Figure 19:
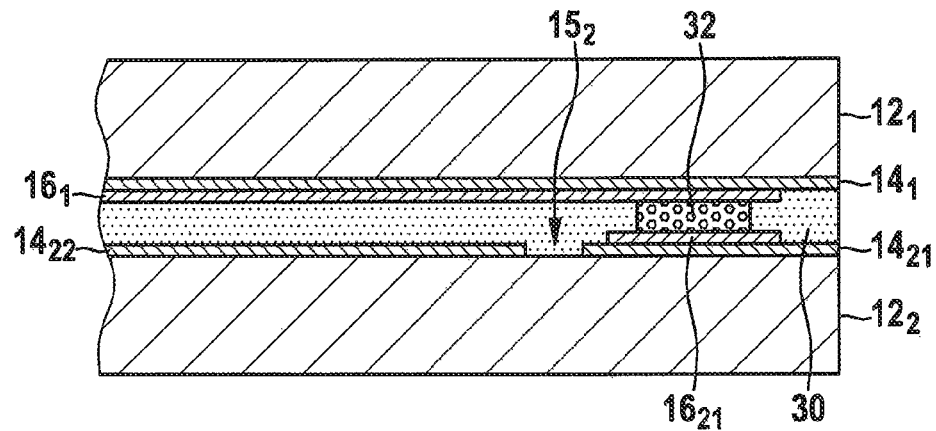

Furthermore, with reference to FIG. 19, the dot 32, being appropriately sized, of a conductive adhesive/sealant, the product EPO-TEK H20E, is applied at an end towards the top side of the busbar $16_1$ of the first substrate $12_1$, approximately 4.5 mm from the top side and the right-hand side of the first substrate $12_1$. The first substrate $12_1$ and the second substrate $12_2$ are paired such that the top, left-hand and bottom sides of second substrate $12_2$ are aligned with the top, former right-hand and bottom sides of first substrate $12_1$, leaving a space of 5 mm on the right-hand side of the second substrate $12_2$ with the second busbar $16_{22}$ along the right-hand side of the second substrate $12_2$ exposed. Furthermore, the busbar $16_1$ of first substrate $12_1$ is aligned in parallel to the second busbar $16_{22}$ on the second substrate $12_2$ and perpendicular to the first busbar $16_{21}$ on the second substrate $12_2$, such that the dot 32 of conductive adhesive/sealant creates, at an intersection of the busbar $16_1$ on first substrate $12_1$ and first busbar $16_{21}$ on the second substrate $12_2$, an electrical interconnection (via) between the busbar $16_1$ on first substrate $12_1$ and first busbar $16_{21}$ on the second substrate $12_2$.

The liquid-crystal cell has thus a size of 308 mm×300 mm and a thickness of approximately 6 mm. Both the first and second busbars $16_{21}$, $16_{22}$ on the second substrate $12_2$ are at least partially exposed. A filling port is left in a main sealant 30 on one of the two longer sides of the liquid-crystal cell. The liquid-crystal cell is filled with a dye-doped liquid crystal using a vacuum filling process, and the filling port is sealed using an UV curable sealant.

Figure 20:
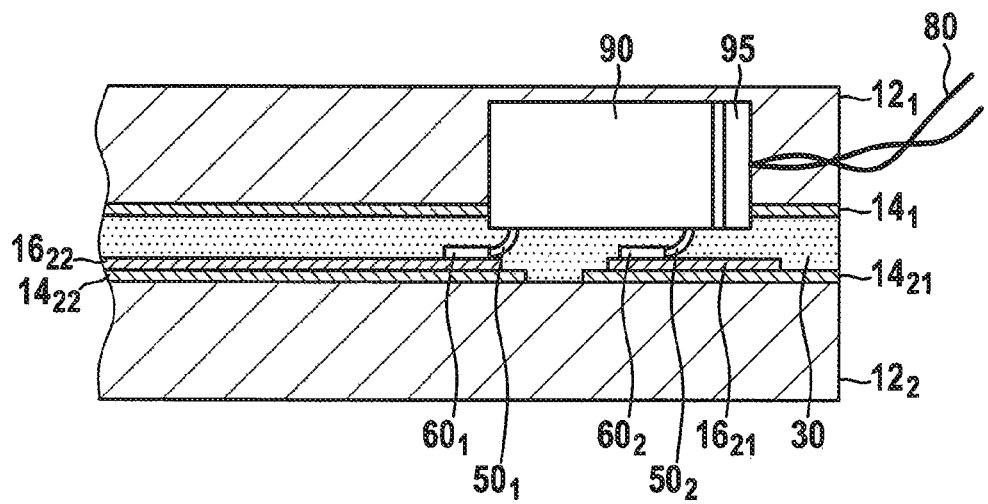

With reference to FIG. 20, at an exposed end of each of the two busbars $16_{21}$, $16_{22}$, drops of a conductive adhesive/sealant, the product EPO-TEK H20E, are applied with a spatula to form conductive adhesive spots $60_1$, $60_2$. A five-terminal wire-to-board connector 90, the product Pico-EZmate part no. 78171-005 by Molex, Inc., is placed on the conductive adhesive spots $60_1$, $60_2$, such that a first electrical contact of the wire-to-board connector 90 connects to the first busbar $16_{21}$ and a fifth electrical contact of the wire-to-board connector 90 connects to the second busbar $16_{22}$. Second to fourth electrical contacts situated between the first electrical contact and the fifth electrical contact are left free; they may electrically contact either the first busbar $16_{21}$ or the second busbar $16_{22}$ provided that they do not create an electrical interconnection between these two busbars $16_{21}$, $16_{22}$. The wire-to-board connector 90 is placed in parallel to the second busbar $16_{22}$, with a port of the wire-to-board connector 90 facing towards the right-hand side of the second substrate $12_2$. To cure the conductive adhesive/sealant, the liquid-crystal cell is placed in an oven and heated at 140° C. for a period of 20 minutes.

A small piece of protective tape, the product Kapton polyimide film by DuPont, is applied over the wire-to-board connector 90 to prevent any unwanted material from polluting the wire-to-board connector 90. A third glass substrate having a size of 300 mm×300 mm and a glass thickness of 4 mm, is aligned with the first substrate $12_1$, also having a size of 300 mm×300 mm, and laminated with a PVB foil, having a thickness of 0.76 mm, to of the liquid-crystal cell in a vacuum laminating system at 140° C. The laminated liquid-crystal cell is then processed into an insulated glass unit by attaching an aluminium spacer bar, having a width of 16 mm and a thickness of 5.5 mm and being bend into a rectangular shape having inner dimensions of 276 mm×276 mm. The third glass substrate laminated to the liquid-crystal cell is positioned towards an outside of the insulating glass unit. The spacer bar is attached to the glass using an isobutyl sealant between the spacer and the glass. A fourth glass substrate having a size of 308 mm×300 mm is used to complete the insulating glass unit. The cavity created by the spacer bar is filled with argon gas. The area between the spacer bar and a perimeter of the glass substrate is filled with a polysulfite sealant. As the wire-to-board connector 90 faces out off the insulating glass unit, no polysulfite needs to be removed. However, the protective tape is removed.

A cable assembly comprising two insulated copper wires 80 and a five-terminal receptical housing 95, the product Pico-EZmate part no. 78172-005 by Molex, Inc., is placed in the wire-to-board connector 90 inside the insulated glass unit, wherein the two copper wires 80 connected to a first position and a fifth position of the receptical housing 95. This complete interconnection is sealed with a silicone sealant, the product AS1745T.

FIG. 21 shows views of an article 2 comprising devices 1; 1$_1$, 1$_2$ for controlling transmission of radiation according to exemplary embodiments of the invention. The FIG. 21 comprises a cross-sectional side view and a top view, situated below the cross-sectional side view.

A insulating glass window may, for example, comprise two devices 1; 1$_1$, 1$_2$ for controlling transmission of radiation and a circumferential seal 3 positioned between the devices 1; 1$_1$, 1$_2$. Alternatively, the double glazed window may comprise one devices 1; 1$_1$, 1$_2$ and a conventional sheet of glass.

The article 2 may comprise the insulating glass window and a circumferential frame 4.

Although specific embodiments have been illustrated and described herein, it will be appreciated by those of ordinary skill in the art, that any arrangement which is calculated to achieve the same purpose may be substituted for the specific embodiments shown. It is to be understood, that the above description is intended to be illustrative and not restrictive. This application is intended to cover any adaptations or variations of the invention. Combinations of the above embodiments and many other embodiments will be apparent to those of skill in the art upon reading and understanding the above description. The scope of the invention includes any other embodiments and applications in which the above structures and methods may be used. The scope of the invention is, therefore, defined only by the appended claims, along with the full scope of equivalents to which such claims are entitled.

The invention claimed is:

1. A device (1; 1$_1$, 1$_2$) for controlling transmission of radiation, comprising:
a first substrate (12$_1$; 12$_1$') comprising a first conductive layer (14$_1$');
a second substrate (12$_2$; 12$_2$') comprising a second conductive layer (14$_2$');
an active layer (20) positioned between the first conductive layer (14$_1$') and the second conductive layer (14$_2$') for controlling the transmission of the radiation by altering its light transmissivity dependent on a voltage applied to the first conductive layer (14$_1$') and the second conductive layer (14$_2$');
a first contact (50$_1$) for providing a first electrical connection to the first conductive layer (14$_1$');
a first portion (60$_1$) of an adhesive or a solder for attaching a first proximal end (52$_1$) of the first contact (50$_1$) to the first conductive layer (14$_1$');
a second contact (50$_2$) for providing a second electrical connection to the second conductive layer (14$_2$'); and
a second portion (60$_2$) of the adhesive or solder for attaching a second proximal end (52$_2$) of the second contact (50$_2$) to the second conductive layer (14$_2$');
wherein:
the first contact (50$_1$) is accommodated in a first space (40$_1$) freed by the second substrate (12$_2$; 12$_2$');
the second contact (50$_2$) is accommodated in a second space (40$_2$) freed by the first substrate (12$_1$; 12$_1$')
the first substrate (12$_1$; 12$_1$') comprises glass, silica glass, plastics or polyethylene terephthalate;
the second substrate (12$_2$; 12$_2$') comprises glass, silica glass, plastics or polyethylene terephthalate;
the first substrate (12$_1$; 12$_1$') and the second substrate (12$_2$; 12$_2$') are identical or inverse to each other;
the first substrate (12$_1$; 12$_1$') has a first basic shape of a quadrilateral, parallelogram, rhombus, rhomboid, rectangle, square or oblong;
the second substrate (12$_2$; 12$_2$') has a second basic shape of a quadrilateral, parallelogram, rhombus, rhomboid, rectangle, square or oblong;
the first space (40$_1$) and the second space (40$_2$) are identical or inverse to each other;
the first space (40$_1$) has a first shape of a triangle, rectangle, square or oblong;
the first space (40$_1$) in the first substrate (12$_1$; 12$_1$') is obtained by removing the first shape from a first blank substrate (10$_1$);
the second space (40$_2$) has a second shape of a triangle, rectangle, square or oblong; and
the second space (40$_2$) in the second substrate (12$_2$; 12$_2$') is obtained by removing the second shape from a second blank substrate (10$_2$).

2. The device (1; 1$_1$, 1$_2$) of claim 1, further comprising:
a first electrical connector (90$_1$), wire-to-board connector, port or interface for housing the first contact (50$_1$); and
a second electrical connector (90$_2$), wire-to-board connector, port or interface for housing the second contact (50$_2$).

3. The device (1; 1$_1$, 1$_2$) of claim 1, wherein:
a first distal end (54$_1$) of the first contact (50$_1$) is aligned parallel or perpendicular to the first conductive layer (14$_1$'); and
a second distal end (54$_2$) of the second contact (50$_2$) is aligned parallel or perpendicular to the second conductive layer (14$_1$').

4. The device (1; 1$_1$, 1$_2$) of claim 1, wherein:
the first contact (50$_1$) is a first pin contact or a first socket contact;
the second contact (50$_2$) is a second pin contact or a second socket contact; and
the adhesive is an electrically conductive adhesive.

5. The device (1; 1$_1$, 1$_2$) of claim 1, wherein:
the first conductive layer (14$_1$) comprises metal, metal oxide, doped metal oxide, doped binary compounds, carbon nanotubes, graphene, or conductive polymers; and
the second conductive layer (14$_2$) comprises metal, metal oxide, doped metal oxide, doped binary compounds, carbon nanotubes, graphene, or conductive polymers.

6. The device (1; 1$_1$, 1$_2$) of claim 1, further comprising:
a first conductive line (16$_1$), structured on the first conductive layer (14$_1$') and extending from the first contact (50$_1$) onto the first conductive layer (14$_1$'), for electrically connecting the first conductive layer (14$_1$') to the first contact (50$_1$), wherein a thickness of the first conductive line is less than a thickness of the active layer (20).

7. The device (1; 1$_1$, 1$_2$) of claim 6, wherein:
the first conductive line is structured (a) outside a visible area of the device (1; 1$_1$, 1$_2$), (b) under a main sealant, or (c) inside an area between a main sealant and an edge of the first substrate (12$_1$; 12$_1$').

8. A device ($1$; $1_1$, $1_2$) for controlling transmission of radiation, comprising:
- a first substrate ($12_1$; $12_1'$) comprising a first conductive layer ($14_1'$);
- a second substrate ($12_2$; $12_2'$) comprising a second conductive layer ($14_2'$);
- an active layer ($20$) positioned between the first conductive layer ($14_1'$) and the second conductive layer ($14_2'$) for controlling the transmission of the radiation by altering its light transmissivity dependent on a voltage applied to the first conductive layer ($14_1'$) and the second conductive layer ($14_2'$);
- a first contact ($50_1$) for providing a first electrical connection to the first conductive layer ($14_1'$);
- a first portion ($60_1$) of an adhesive or a solder for attaching a first proximal end ($52_1$) of the first contact ($50_1$) to the first conductive layer ($14_1'$);
- a second contact ($50_2$) for providing a second electrical connection to the first conductive layer ($14_2'$); and
- a second portion ($60_2$) of the adhesive or solder for attaching a second proximal end ($52_2$) of the second contact ($50_2$) to the first conductive layer ($14_1'$);

wherein:
- the first contact ($50_1$) is attached to a first area of the first conductive layer ($14_1'$);
- the second contact ($50_2$) is attached to a second area of the first conductive layer ($14_1'$);
- the first conductive layer ($14_1'$) is structured such that the first area and the second area are electrically isolated from each other; and
- the second area of the first conductive layer ($14_1'$) and the second conductive layer ($14_2'$) are electrically connected to each other.

9. The device ($1$; $1_1$, $1_2$) of claim 8, wherein:
the second area of the first conductive layer ($14_1'$) and the second conductive layer ($14_2'$) are electrically connected via an interconnection, a conductive sealant, or a sealant comprising a conductive particle or a plurality of conductive particles.

10. A method for controlling transmission of radiation, comprising:
- providing a device according to claim 1; and
- supplying voltage to the first contact ($50_1$) and the second contact ($50_2$).

11. A method of making a device ($1$; $1_1$, $1_2$) for controlling transmission of radiation, comprising:
- providing a first substrate ($12_1$; $12_1'$) comprising a first conductive layer ($14_1'$);
- providing a second substrate ($12_2$; $12_2'$) comprising a second conductive layer ($14_2'$);
- positioning an active layer ($20$) between the first conductive layer ($14_1'$) and the second conductive layer ($14_2'$) for controlling the transmission of the radiation by altering its light transmissivity dependent on a voltage applied to the first conductive layer ($14_1'$) and the second conductive layer ($14_2'$);
- providing a first contact ($50_1$) for providing a first electrical connection to the first conductive layer ($14_1'$);
- using a first portion ($60_1$) of an adhesive or a solder for attaching a first proximal end of the first contact ($50_1$) to the first conductive layer ($14_1'$);
- providing a second contact ($50_2$) for providing a second electrical connection to the second conductive layer ($14_2'$); and
- using a second portion ($60_2$) of the adhesive or solder for attaching a second proximal end of the second contact ($50_2$) to the first conductive layer ($14_2'$);

wherein:
- the first contact ($50_1$) is accommodated in a first space ($40_1$) freed by the second substrate ($12_2$; $12_2'$);
- the second contact ($50_2$) is accommodated in a second space ($40_2$) freed by the first substrate ($12_1$; $12_1'$);
- the first substrate ($12_1$; $12_1'$) comprises glass, silica glass, plastics or polyethylene terephthalate;
- the second substrate ($12_2$; $12_2'$) comprises glass, silica glass, plastics or polyethylene terephthalate;
- the first substrate ($12_1$; $12_1'$) and the second substrate ($12_2$; $12_2'$) are identical or inverse to each other;
- the first substrate ($12_1$; $12_1'$) has a first basic shape of a quadrilateral, parallelogram, rhombus, rhomboid, rectangle, square or oblong;
- the second substrate ($12_2$; $12_2'$) has a second basic shape of a quadrilateral, parallelogram, rhombus, rhomboid, rectangle, square or oblong;
- the first space ($40_1$) and the second space ($40_2$) are identical or inverse to each other;
- the first space ($40_1$) has a first shape of a triangle, rectangle, square or oblong;
- the first space ($40_1$) in the first substrate ($12_1$; $12_1'$) is obtained by removing the first shape from a first blank substrate ($10_1$);
- the second space ($40_2$) has a second shape of a triangle, rectangle, square or oblong; and
- the second space ($40_2$) in the second substrate ($12_2$; $12_2'$) is obtained by removing the second shape from a second blank substrate ($10_2$).

12. An article ($2$) comprising at least one device as claimed in claim 1.

13. The article ($2$) as claimed in claim 12, wherein the article is a door, window, double-glazed window, wall, partition wall, display or display screen.

14. The device ($1$; $1_1$, $1_2$) of claim 1, wherein the first contact ($50_1$) is situated on a first side of the device ($1$; $1_1$, $1_2$), and the second contact ($50_2$) is situated on a second side of the device ($1$; $1_1$, $1_2$), being opposite to the first side.

15. The device ($1$; $1_1$, $1_2$) of claim 1, wherein the first contact ($50_1$) is situated on a first corner of the device ($1$; $1_1$, $1_2$) and the second contact ($50_2$) is situated on a second corner of the device ($1$; $1_1$, $1_2$), being opposite to the first corner.

16. The device ($1$; $1_1$, $1_2$) of claim 1, wherein the first contact ($50_1$) and the second contact ($50_2$) are situated on one corner of the device ($1$; $1_1$, $1_2$).

17. The device ($1$; $1_1$, $1_2$) of claim 1, wherein:
- a thickness of the first contact ($50_1$) is less than a thickness of the first substrate ($12_1$; $12_1'$) or a thickness of the second substrate ($12_2$; $12_2'$); and
- a thickness of the second contact ($50_2$) is less than the thickness of the first substrate ($12_1$; $12_1'$) or the thickness of the second substrate ($12_2$; $12_2'$).

18. The device ($1$; $1_1$, $1_2$) of claim 1, wherein the adhesive is a curable adhesive, two-component curable adhesive, radiation-curable adhesive, light-curable adhesive, ultraviolet-curable adhesive, thermally curable adhesive, heat-curable adhesive, hotmelt adhesive, or humidity-curable adhesive.

19. The device ($1$; $1_1$, $1_2$) of claim 1, wherein:
- the first conductive layer ($14_1$) comprises silver, silver oxide, tin-doped indium oxide, aluminum-doped zinc oxide, indium-doped cadmium oxide, or poly(3,4-ethylenedioxythiophene) polystyrene sulfonate; and
- the second conductive layer ($14_2$) comprises silver, silver oxide, tin-doped indium oxide, aluminum-doped zinc oxide, indium-doped cadmium oxide, or poly(3,4-ethylenedioxythiophene) polystyrene sulfonate.

20. The device (1; $1_1$, $1_2$) of claim 1, wherein:
the first conductive layer ($14_1$) is structured on the first substrate ($12_1$; $12_1'$) by selective deposition, printing, screen printing, ink jet printing, selective removal, etching, wet etching, scribing or Laser scribing; and
the second conductive layer ($14_2$) is structured on the second substrate ($12_2$; $12_2'$) by selective deposition, printing, screen printing, ink jet printing, selective removal, etching, wet etching, scribing or Laser scribing.

21. The device (1; $1_1$, $1_2$) of claim 1, wherein the active layer (20) is a liquid crystal layer, polymer-dispersed liquid crystal layer, suspended particle display layer, electrochromatic layer, electrowetting layer or electrophoretic layer.

22. The device (1; $1_1$, $1_2$) of claim 1, wherein the active layer (20) comprises liquid crystals, dye-doped liquid crystals, polymer-dispersed liquid crystals or suspended particles.

23. The device (1; $1_1$, $1_2$) of claim 6, further comprising a second conductive line ($16_2$; $16_{22}$), structured on the second conductive layer ($14_2'$) and extending from the second contact ($50_2$) onto the second conductive layer ($14_2'$), for electrically connecting the second conductive layer ($14_2'$) to the second contact ($50_2$), wherein a thickness of the second conductive line is less than the thickness of the active layer (20).

24. The device (1; $1_1$, $1_2$) of claim 6, wherein the first conductive line ($16_1$) is structured on the first conductive layer ($14_1'$) by selective deposition, printing, screen printing, ink jet printing, selective removal, etching, wet etching, scribing or Laser scribing.

25. The device (1; $1_1$, $1_2$) of claim 6, wherein the first conductive line ($16_1$) is in direct contact with the first portion ($60_1$) of the adhesive or solder.

26. The device (1; $1_1$, $1_2$) of claim 22, wherein the second conductive line is structured (a) outside a visible area of the device (1; $1_1$, $1_2$), (b) under a main sealant, or (c) inside an area between a main sealant and an edge of the second substrate ($12_2$; $12_2'$).

27. The device (1; $1_1$, $1_2$) of claim 22, wherein the second conductive line ($16_2$; $16_{22}$) is structured on the second conductive layer ($14_2'$) by selective deposition, printing, screen printing, ink jet printing, selective removal, etching, wet etching, scribing or Laser scribing.

28. The device (1; $1_1$, $1_2$) of claim 22, wherein the second conductive line ($16_2$) is in direct contact with the second portion ($60_2$) of the adhesive or solder.

* * * * *